(12) United States Patent
Ishihara et al.

(10) Patent No.: US 7,155,503 B2
(45) Date of Patent: Dec. 26, 2006

(54) DATA SERVER

(75) Inventors: Akira Ishihara, Tokyo (JP); Masayo Osaki, Tokyo (JP); Akira Sugimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 833 days.

(21) Appl. No.: 10/223,289

(22) Filed: Aug. 20, 2002

(65) Prior Publication Data

US 2003/0172154 A1    Sep. 11, 2003

(30) Foreign Application Priority Data

Mar. 11, 2002   (JP)   ............... 2002-065646

(51) Int. Cl.
  *G06F 15/173* (2006.01)
(52) U.S. Cl. ............... 709/223; 707/3; 707/10
(58) Field of Classification Search ........ 709/223–224; 707/102, 104.1
See application file for complete search history.

(56) References Cited

U.S. PATENT DOCUMENTS

| 5,724,575 | A | * | 3/1998 | Hoover et al. ............ 707/10 |
| 5,748,881 | A | * | 5/1998 | Lewis et al. ............... 714/47 |
| 5,809,507 | A | * | 9/1998 | Cavanaugh, III ....... 707/103 R |
| 5,873,097 | A | * | 2/1999 | Harris et al. ............ 707/203 |
| 6,133,947 | A | | 10/2000 | Mikuni |
| 6,460,071 | B1 | * | 10/2002 | Hoffman .................. 709/203 |
| 6,738,807 | B1 | * | 5/2004 | Matsui et al. ........... 709/223 |
| 6,889,223 | B1 | * | 5/2005 | Hattori et al. ............. 707/3 |
| 6,973,490 | B1 | * | 12/2005 | Robertson et al. ....... 709/224 |
| 7,039,624 | B1 | * | 5/2006 | Merk et al. ................ 707/1 |
| 2003/0055815 | A1 | * | 3/2003 | Chender et al. ............. 707/3 |
| 2005/0165807 | A1 | * | 7/2005 | Srinivasan et al. ....... 707/100 |
| 2005/0262137 | A1 | * | 11/2005 | Lipe et al. ............ 707/103 R |

FOREIGN PATENT DOCUMENTS

| JP | 6-195241 | 7/1994 |
| JP | 8-77119 | 3/1996 |
| JP | 2000-163122 | 6/2000 |

* cited by examiner

*Primary Examiner*—Abdullahi Salad
(74) *Attorney, Agent, or Firm*—Leydig, Voit & Mayer, Ltd.

(57) ABSTRACT

The present invention has a plurality of objects each holding state data as its attribute data, and employs the following steps: an object structure management means searches for an object based on an object identifier; an attribute data input/output means updates attribute data of the object by use of changed state data; and when a remote display system has issued an attribute data retrieval request, the object structure management means searches for an object based on an object identifier included in the attribute data retrieval request, and the attribute data input/output means retrieves attribute data of the object and returns it.

4 Claims, 19 Drawing Sheets

STATE DATA MANAGEMENT TABLE 12

| STATE DATA IDENTIFIER | OBJECT IDENTIFIER | ATTRIBUTE NAME |
|---|---|---|
| STATE DATA IDENTIFIER 12a | OBJECT IDENTIFIER 12b | ATTRIBUTE NAME 12c |
| — | — | — |

ATTRIBUTE DATA ASSOCIATION TABLE 16

| REPLACEMENT ATTRIBUTE DATA | | ATTRIBUTED DATA TO BE REPLACED | |
|---|---|---|---|
| OBJECT IDENTIFIER | ATTRIBUTE NAME | OBJECT IDENTIFIER | ATTRIBUTE NAME |
| OBJECT IDENTIFIER 16a | ATTRIBUTE NAME 16b | OBJECT IDENTIFIER 16c | ATTRIBUTE NAME 16d |
| — | — | — | — |

STATE DATA MANAGEMENT TABLE 13

| STATE DATA IDENTIFIER | OBJECT IDENTIFIER | ATTRIBUTE NAME |
|---|---|---|
| STATE DATA IDENTIFIER 13a | OBJECT IDENTIFIER 13b | ATTRIBUTE NAME 13c |
| — | — | — |

GENERIC DATA RETRIEVAL REQUEST 25-1

| DATA PATH INDICATION PORTION | QUERY INDICATION PORTION |
|---|---|
| http://host/ ‾IDENTIFIER OF REQUEST CONVERSION SUB-SECTION‾ | ?name=‾COMPONENT IDENTIFIER &attr=‾ATTRIBUTE NAME |

GENERIC DATA RETRIEVAL REQUEST 25-2

| DATA PATH INDICATION PORTION | | QUERY INDICATION PORTION |
|---|---|---|
| http://host/ ‾COMPONENT IDENTIFIER‾ | #‾ATTRIBUTE NAME‾ | |

FIG.21

CONTEXT MANAGEMENT TABLE 31

CONTEXT DEFINITION 31-1 contextBind(N22c,N20c,C1)

CONTEXT DEFINITION 31-2 contextBind(N22c,N20f,C1)

CONTEXT DEFINITION 31-3 contextBind(N22e,N20g,N20ga2,C1)

FIG.22

GENERIC DATA RETRIEVAL REQUEST 25-11

| DATA PATH INDICATION PORTION | QUERY INDICATION PORTION |
|---|---|
| http://host/ ¯IDENTIFIER OF REQUEST CONVERSION SUB-SECTION¯ | ?name=¯COMPONENT IDENTIFIER¯ &attr=¯ATTRIBUTE NAME¯ &type=¯CONTEXT IDENTIFIER¯ |

GENERIC DATA RETRIEVAL REQUEST 25-12

| DATA PATH INDICATION PORTION | | QUERY INDICATION PORTION |
|---|---|---|
| http://host/ ¯COMPONENT IDENTIFIER¯ | #¯ATTRIBUTE NAME¯ | ?type= ¯CONTEXT IDENTIFIER¯ |

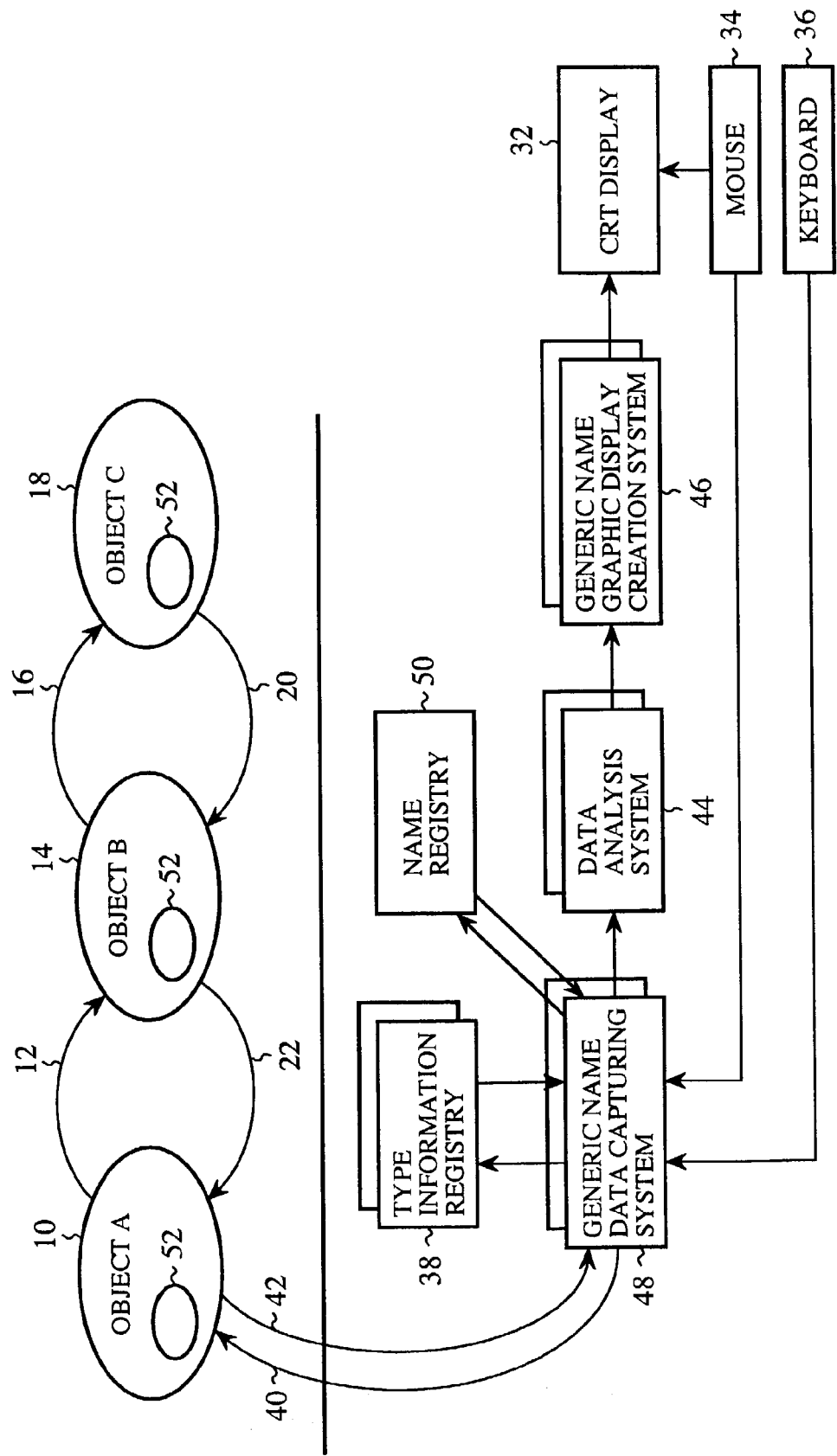

DATA SERVER

BACKGROUND OF THE INVENTION

1. Field of the Invention

The present invention relates to a data server which manages state data indicating, in real time, the state of a data processing system or a data processing apparatus to be monitored and which sends the state data to a remote display system upon receiving a data retrieval request from the remote display system.

2. Description of Related Art

FIG. 24 is a diagram schematically showing the configuration of a monitoring/control system including a plurality of conventional monitoring/control apparatuses disclosed in JP-A No. 2000-163122 entitled "Monitoring/Control Computer Built-in Data Management Apparatus". In the figure, reference numeral 2a1 denotes a monitoring/control computer; S1 a facility/apparatus to be controlled; 4a1 a remote terminal; and 3 a general network. Reference numeral 5a1 denotes a data management apparatus composed of a data processing unit 10, a shared memory 11 for holding state data, and an input/output unit 12. Reference numeral B1 denotes a browser function included in the remote terminal 4a1.

The operation will be described below.

The remote terminal 4a1 issues a data transmission request through the general network 3, and the input/output unit 12 reads state data corresponding to the transmission request from the shared memory 11 and outputs it to the remote terminal 4a1 through the general network 3.

In this monitoring/control system, the monitoring/control computer 2a1 functions as a data server for returning state data of the facility/apparatus S1 to be controlled upon receiving a request from the remote terminal 4a1. However, since the state data is mapped to the shared memory 11, it is not possible to process the state data or add any association data to it.

FIG. 25 is a block diagram showing the internal configuration of the conventional monitoring/control system shown in FIG. 24. In the figure, reference numeral 35 denotes an interface program; 35a an interface unit for remote terminals; 35b a shared memory data setting/retrieval unit; 35c a file data setting/retrieval unit, and 51 a screen database storage unit.

The interface program 35 is made up of objects written in a Java®, which is an object-oriented programming language. However, the interface program 35 realizes only an input/output function for the shared memory 11 by use of objects. The program cannot process the state data or add any association data to it. It is easy to add a data processing function to an object included in the interface program 35. However, it is not so easy to specify a means for extracting a data processing result from the object to which the data processing function has been added.

FIG. 26 is a block diagram schematically showing the configuration of a conventional service processing function monitoring apparatus disclosed in JP-A No. 8-77119 (1996) entitled "Service Processing Function Monitoring Apparatus and Method therefor". In the figure, reference numerals 301 to 305 denote object instances (OIs) each acting as a component of a service processing function, while 200 to 204 denote OI monitoring objects (OIMs) each for monitoring whether an object instance is properly operating. Reference numeral 16 denotes an OI management system; 16a an OI operation data management function; 17 a communications service administrator; 18 a service management system; 19 and 20 service processing nodes; and 13 and 14 service execution control apparatuses.

To realize processing and communications services, the service processing function monitoring method employed by this service processing apparatus uses object-oriented software in which object instances exchange messages with one another under control of the OI management system 16, collectively implementing a desired processing function.

The operation will be described below.

Upon detecting an abnormality in one of the object instances 301 to 305, the OI monitoring objects 200 to 204 perform a check for diagnosing the abnormality in the object instance. The OI monitoring objects notify the diagnosis result to the OI management system 16 which then carries out service operation management based on the diagnoses result.

Thus, the service processing function monitoring method is characterized in that: object instances exchanging messages with one another collectively realize a desired service function; OI monitoring objects monitor the state of the object instances; and the OI management system 16 collects monitoring results to carry out service operation management. The OI management system 16, acting as a remote display system, retrieves data in the object instances through the OI monitoring object group functioning as a data server. However, this conventional method has a problem in that the data which can be collected by the OI management system 16 is limited to diagnosis data output from the OI monitoring objects, and it is not possible to retrieve data in the object instances and the OI monitoring objects as necessary. Another problem is that the OI monitoring objects send failure diagnosis results to the OI management system 16, unilaterally. It is desirable that the OI management system 16 can retrieve data at an arbitrary timing, for example, at certain intervals or when a predetermined event has occurred in the object instances. FIG. 27 is a block diagram showing a conventional real-time monitoring/display system disclosed in JP-A No. 6-195241 (1994) entitled "Real-Time Monitoring/Display Method and Computer System Using the Method". In the figure, reference numerals 10, 14, and 18 denote an object A, object B, and object C, respectively, and reference numeral 52 denotes a table object. Reference numeral 32 denotes a CRT display; 34 a mouse; 36 a keyboard; 38 a type information registry; 44 a data analysis system; 46 a generic name graphic display creation system; 48 a generic name data capturing system; and 50 a name registry.

The generic name data capturing system 48 is a means for capturing specified performance data or another type of data of the object A10 by use of the type information registry 38 and the name registry 50. This technique is applied to object-oriented distributed computer systems in which the performance and the characteristics of each object is to be monitored and displayed without any knowledge of the object beforehand.

The operation will be described below.

The user selects a target object by specifying the object name by use of the mouse 34 or the keyboard 36 connected to the generic name data capturing system 48 and the CRT display 32. The generic name data capturing system 48 makes inquiries to the name registry 50 to find an object reference and to the type information registry 38 to check the object type of the target object, and calls the monitoring method 40 to obtain the result 42. Furthermore, the generic name data capturing system 48 periodically calls the monitoring method 40 to continue to obtain the result 42.

However, this method has a problem in that it is not possible to obtain the result 42 from an object not registered with the name registry 50, and the generic name capturing system 48 must continue to call the monitoring method 40 periodically in order to monitor changes in object data, making it impossible to handle an object structure.

In the conventional data server configured as described above, a remote display system includes an input/output function dedicated for a data processing system/apparatus to obtain its state data. Therefore, it is necessary to develop a remote display system for each data processing system/apparatus. Furthermore, changing the input/output function of a data processing system/apparatus necessitates a change in the input/output function of the corresponding remote display system, which is troublesome.

Another problem with the conventional data server is that state data which can be retrieved by a remote display system is limited to that predetermined by the data processing systems/apparatuses. Therefore, the remote display system cannot obtain an intermediate result of state data processing performed within a data processing system/apparatus, and to change this arrangement, it is necessary to change the input/output function of the data processing system/apparatus.

Still another problem with the conventional data server is that it is difficult to associate one piece of state data with another or associate state data with state data in another data processing system or data in a database. Therefore, it is not possible to handle information by means of association.

SUMMARY OF THE INVENTION

The present invention has been devised to solve the above problems. Therefore, one object of the present invention is to provide a data server with which it is made possible to realize a general-purpose remote display system unaffected by any change in a data processing system/apparatus and its input/output function.

Another object of the present invention is to provide a data server with which a remote display system can obtain state data not supported by the input/output function of a data processing system/apparatus, such as an intermediate result of data processing, without changing the data processing system/apparatus.

Still another object of the present invention is to provide a data server with which a remote display system can control a state data retrieval timing and can obtain state data after it was activated without reading state data information beforehand.

Yet another object of the present invention is to provide a data server with which it is possible to retrieve state data from a standard tool such as a Web browser without changing an existing data processing system/apparatus.

Still a further object of the present invention is to provide a data server with which it is possible to associate one piece of state data with another as well as associating state data with data handled by another system such as a database.

According to the present invention, a data server manages state data indicating, in real time, a state of a data processing system/apparatus to be monitored, and returns the state data to a remote display system upon receiving a data retrieval request from the remote display system, the data server comprising: a plurality of objects holding the state data as their attribute data; attribute data input/output section for retrieving or setting arbitrary attribute data of an arbitrary object selected from among the plurality of objects; object structure management section for managing an object structure and searching for an object based on an entered object identifier; and input/output control unit; wherein the input/output control unit performs steps of: when the state data has been changed, determining an object identifier and an attribute name associated with the change, causing the object structure management section to search for an object based on the determined object identifier, and causing the attribute data input/output section to update attribute data of the object by use of the changed state data; and upon receiving an attribute data retrieval request from the remote display system, causing the object structure management section to search for an object based on an object identifier included in the attribute data retrieval request, and causing the attribute data input/output section to retrieve attribute data of the object and return the attribute data to the remote display system.

Thus, according to the present invention, state data of a data processing system/apparatus is set as attribute data of an object, and therefore a remote display system can send an attribute data retrieval request to the input/output control unit to obtain the state data of the data processing system/apparatus as the attribute of the object, making it possible to realize a remote display system unaffected by any change in a data processing system/apparatus and its input/output function.

Further, according to the present invention, the data server may further comprise an object structure retrieval section, wherein the object structure management section manages a physical object structure, and when the input/output control unit has received a structural data retrieval request from the remote display system, the object structure retrieval section performs steps of: receiving an object identifier included in the structural data retrieval request through the object structure management section; searching for an object while tracing the physical object structure; obtaining a list of attribute names of the object; and returning the obtained list to the remote display system through the input/output control unit.

With the above arrangement according to the present invention, a remote display system can send a structural data retrieval request to the input/output control unit to obtain a list of the attribute names of any object, and then send a new structural data retrieval request generated from the obtained list of the attribute names of the object. With this, the remote display system can obtain information on the attribute data of an object after it was activated. Thus, the remote display system does not need to read state data information such as a state data list for a data processing system/apparatus before it is activated. Furthermore, an input/output function dedicated for retrieving state data information need not be added to both the data processing system/apparatus and the remote display system.

Still further, according to the present invention, the data server may further comprise: first request conversion section for, when the input/output control unit has received a state data retrieval request dedicated for the data processing system/apparatus, converting the dedicated state data retrieval request into an attribute data retrieval request; and second request conversion section for, when the input/output control unit has received a generic data retrieval request, converting the generic data retrieval request into an attribute data retrieval request or a structural data retrieval request; wherein: for the converted attribute data retrieval request, the object structure management section searches for an object, and the attribute data input/output section retrieves attribute data of the object and returns the obtained attribute data to the remote display system through the input/output control unit; and for the converted structural data retrieval request, the object structure management section searches for an object, and the object structure retrieval section obtains a list of attribute names of the object and returns the list to the remote display system through the input/output control unit.

With the above arrangement, it is possible to retrieve state data based on a standard data retrieval request issued from a standard tool such as a Web browser without changing the data processing system/apparatus.

Still further, in the data server according to the present invention, the object structure management section may manage a plurality of logical object structures together with a physical object structure, and perform steps of: upon receiving an object identifier, searching the physical object structure for an object; and upon receiving a logical object identifier, searching the logical object structures for an object.

With the above arrangement, it is possible to associate one piece of state data with another as well as associating state data with data in another data processing system/apparatus or a database.

BRIEF DESCRIPTION OF THE DRAWINGS

FIG. 21 is an explanatory diagram illustrating the structure of a context management table of the data server according to the sixth embodiment;

FIG. 22 is an explanatory diagram illustrating the structure of a generic data retrieval request used by the data server according to the sixth embodiment;

FIG. 27 is a block diagram showing a conventional real-time monitoring/display system.

DETAILED DESCRIPTION OF THE PREFERRED EMBODIMENTS

Preferred embodiments of the present invention will be described below.

(First Embodiment)

Figure 1:
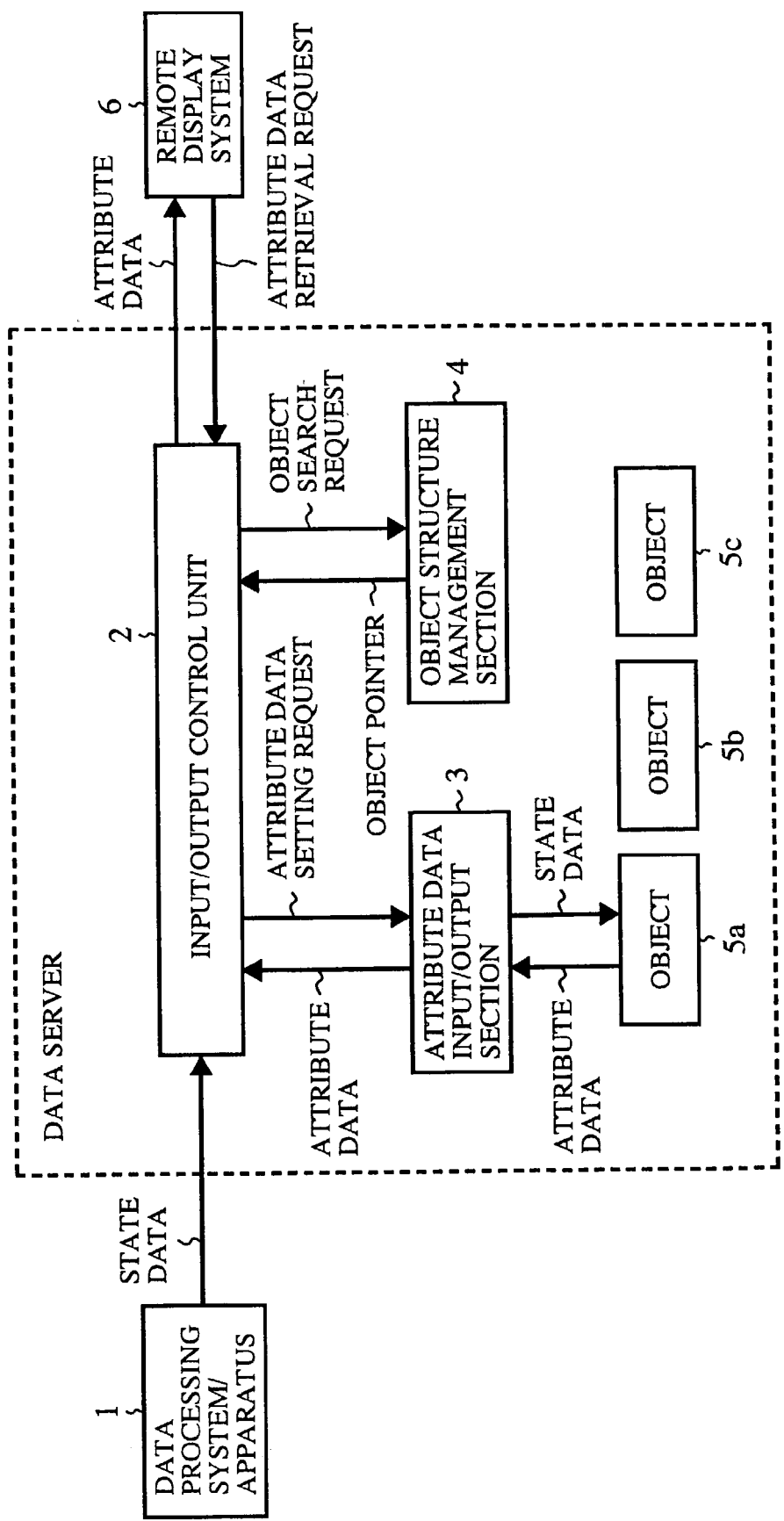
FIG. 1 is a block diagram schematically showing the configuration of a data server according to a first embodiment of the present invention.

FIG. 1 is a block diagram schematically showing the configuration of a data server according to a first embodiment of the present invention. In the figure, reference numeral 1 denotes a data processing system/apparatus, and 2 denotes an input/output control unit. When its state data has been changed, the data processing system/apparatus 1 sends the changed state data to the input/output control unit 2. Reference numerals 5a, 5b, and 5c denote objects. It should be noted that even though the three objects 5a, 5b, and 5c are indicated in the figure, the present invention is not limited to this specific number of objects. To help understand the present invention, the following description assumes that there exists only one object, namely the object 5a, within the data server. The object 5a holds the state data of the data processing system/apparatus 1 as its attribute data. Reference numeral 3 denotes an attribute data input/output section for setting attribute data of the object 5a upon receiving an attribute data setting request from the input/output control unit 2. Furthermore, the attribute data input/output section 3 retrieves attribute data of the object 5a upon receiving an attribute data retrieval request (not shown) from the input/output control unit 2. Reference numeral 4 denotes an object structure management section for returning an object pointer in response to an object search request. An object pointer is a reference used by a program to call a method of an object. Reference numeral 6 denotes a remote display system which is a means for sending an attribute data retrieval request to the input/output control unit 2 to obtain attribute data of the object 5a.

The operation of the server will be described below.

Figure 2:
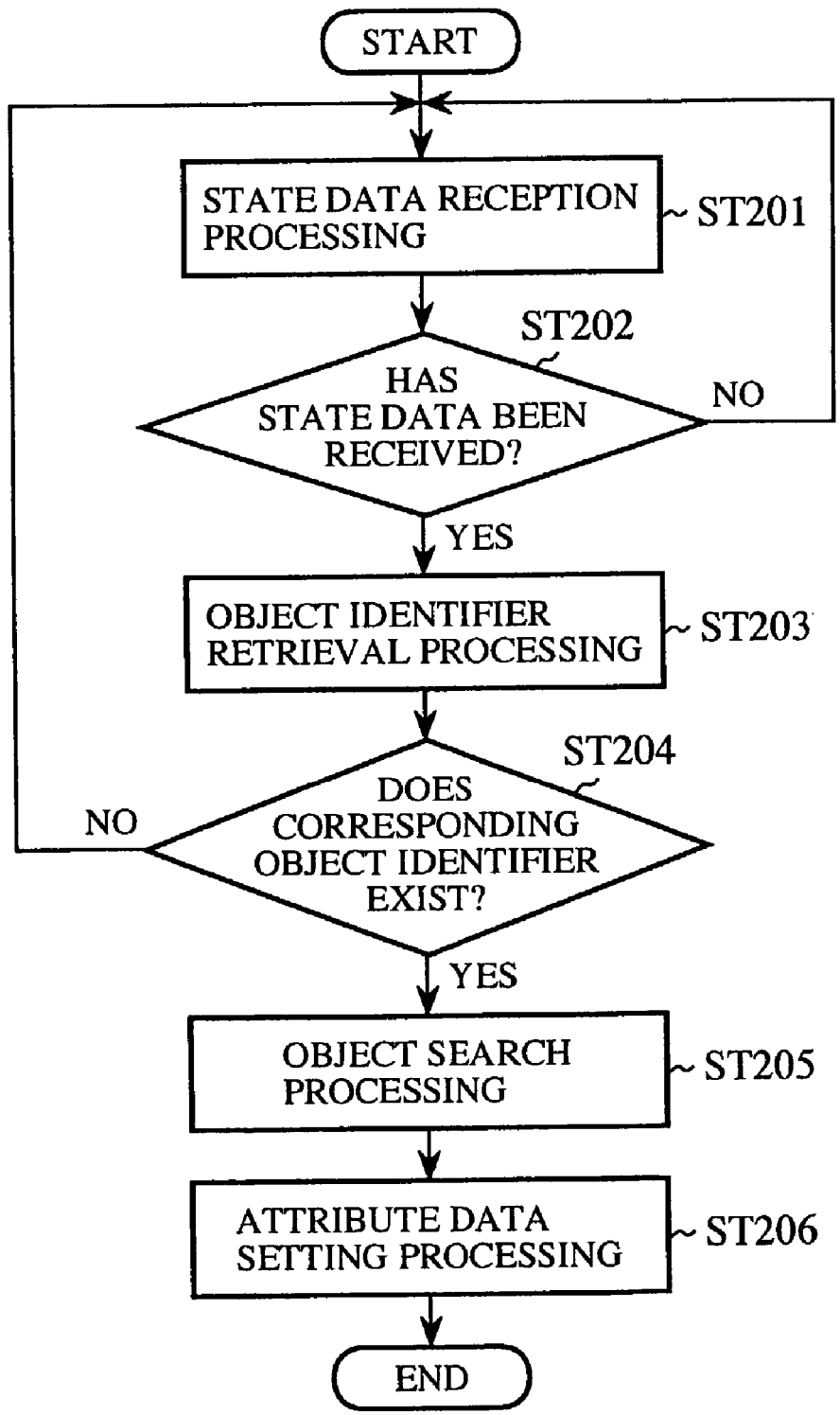
FIG. 2 is a flowchart showing an attribute data setting procedure performed by the data server according to the first embodiment.

The server in the figure mainly performs two types of operation: setting attribute data of an object and obtaining attribute data from the object. FIG. 2 is a flowchart illustrating an attribute data setting operation executed by the data server according to the first embodiment of the present invention.

Upon receiving state data sent from the data processing system/apparatus 1, the input/output control unit 2 performs reception processing on the state data at step ST201. Then, at step ST202, it is determined whether any state data has been received.

Figures 3, 4:
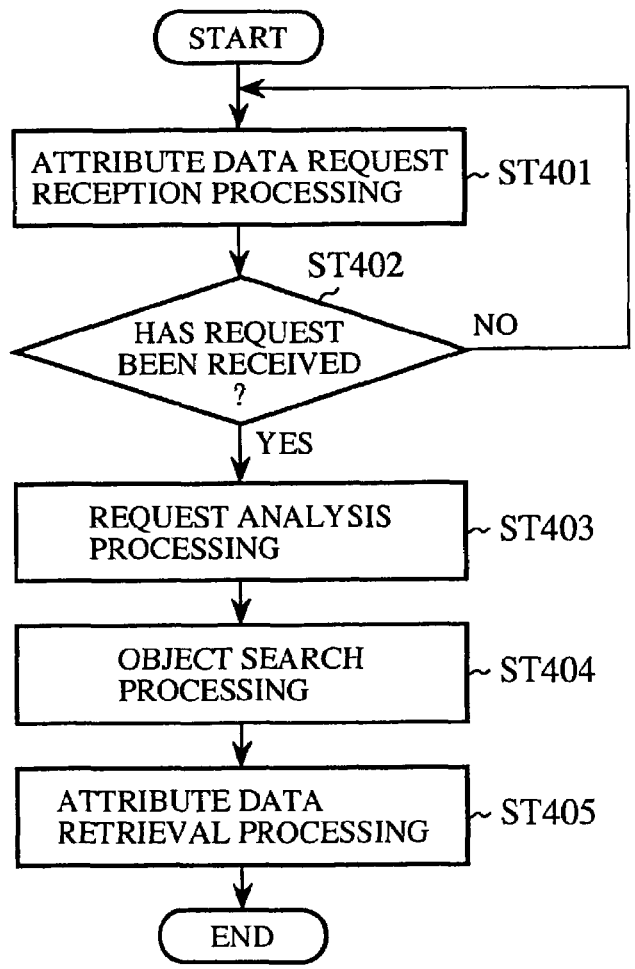
FIG. 3 is an explanatory diagram illustrating a state data management table of the data server according to the first embodiment.
FIG. 4 is a flowchart showing an attribute data retrieval procedure performed by the data server according to the first embodiment.

If a state data has been received, object identifier retrieval processing is carried out at step ST203. A state data management table 12 as shown in FIG. 3 is prepared within the input/output control unit 2 beforehand. At step ST203, the input/output control unit 2 searches the state data management table 12 using the state data identifier as a key, so as to retrieve the object identifier and attribute name of the object 5a. Then, it is determined whether an object identifier corresponding to the received state data has been found (exists) at step ST204.

If there exists a corresponding object identifier, object search processing is carried out at step ST205. In this object search processing, for example, the input/output control unit 2 sends an object search request to the object structure management section 4 which in turn returns an object pointer. This object search request includes, for example, the object identifier and attribute name of the object 5a, and the object structure management section 4 searches for the object 5a based on the object identifier and returns an object pointer.

After the input/output control unit 2 receives the object pointer, attribute data setting processing is carried out at step ST206. In this attribute data setting processing, the input/output control unit 2 sends an attribute data setting request to the attribute data input/output section 3 which in turn updates the attribute data of the object 5a using the state data. For that purpose, the attribute data setting request includes an object pointer to the object 5a, the attribute name of the object 5a, and the state data, for example.

Specifically, the attribute data input/output section 3 performs the following operation in this case, for example. When the Java® programming language, in which a method can be dynamically called, is used, a simple rule is established to generate the name of a method for updating the attribute data, based on the attribute name. For example, the character string "set" is added to the beginning of the attribute name to produce the method name. The attribute data input/output section 3 then obtains the class definition of the object by use of the object pointer, and uses the class definition and the method name to obtain a method object. After that, the attribute data input/output section 3 passes the object pointer and the state data to the obtained method object to execute the method.

FIG. 4 is a flowchart illustrating an attribute data retrieval operation executed by the data server according to the first embodiment of the present invention.

The input/output control unit 2 performs reception processing on an attribute data retrieval request issued by the remote display system 6 at step ST401. At step ST402, it is determined whether any attribute data retrieval request has been received. If an attribute data retrieval request has been received, request analysis processing is carried out at step ST403. An object identifier and an attribute name are obtained from the received attribute data retrieval request. Then, object search processing is carried out at ST404. In this object search processing, the input/output control unit 2 issues an object search request to the object structure management section 4 which in turn returns an object pointer to the input/output control unit 2. For that purpose, the object search request includes an object identifier and an attribute name, for example.

Upon receiving the object pointer, the input/output control unit 2 performs attribute data retrieval processing at step ST405. In this attribute data retrieval processing, for example, the input/output control unit 2 passes the attribute data retrieval request to the attribute data input/output section 3 which in turn retrieves attribute data of the object 5a and returns it to the input/output control unit 2. Upon receiving the attribute data, the input/output control unit 2 passes it to the remote display system 6. It should be noted that the attribute data retrieval request may include an object identifier and an attribute name, for example.

Specifically, the attribute data input/output section 3 performs the following operation in this case, for example. When the Java® programming language, in which a method can be dynamically called, is used, a simple rule is established to generate the name of a method for retrieving the attribute data, based on the attribute name. For example, the character string "get" is added to the beginning of the attribute name to produce the method name. The attribute data input/output section 3 then obtains the class definition of the object by use of the object pointer, and uses the class definition and the method name to obtain the method object. After that, the attribute data input/output section 3 passes the object pointer to the method object to execute the method.

As described above, the data server according to the first embodiment comprises: the plurality of objects 5a, 5b, and 5c holding state data of the data processing system/apparatus 1 as their attribute data; the attribute data input/output section 3; the object structure management section 4; and the input/output control unit 2; wherein the input/output control unit 2 performs steps of: when the state data of the data processing system/apparatus 1 has been changed, causing the object structure management section 4 to search for an object, and causing the attribute data input/output section 3 to update attribute data of the object; and upon receiving an attribute data retrieval request from the remote display system 6, causing the object structure management section 4 to search for an object, and causing the attribute data input/output section 3 to retrieve attribute data of the object and return the attribute data to the remote display system 6.

Thus, since state data of the data processing system/apparatus 1 is set as attribute data of an object, the remote display system 6 can send an attribute data retrieval request to the input/output control unit 2 to obtain the state data of the data processing system/apparatus 1, making it possible to realize the remote display system 6 unaffected by any change in the data processing system/apparatus 1 and its input/output function.

(Second Embodiment)

Figure 5:
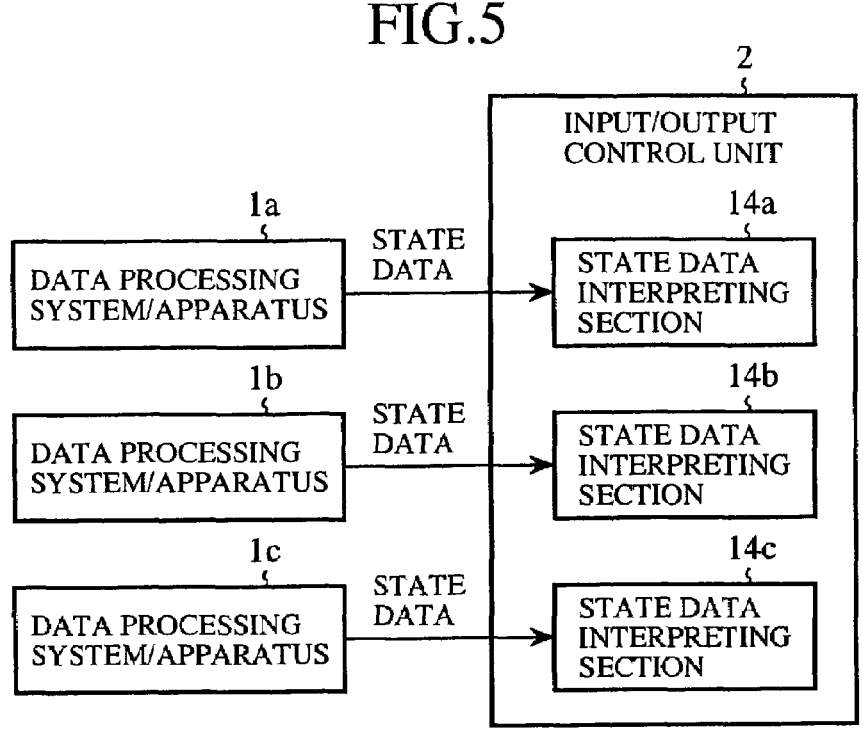
FIG. 5 is a block diagram showing a portion of the configuration of the input/output control unit of a data server according to a second embodiment of the present invention.

FIG. 5 is a block diagram showing a portion of the configuration of the input/output control unit of a data server according to a second embodiment of the present invention. In the figure, the components which are the same as or correspond to those in FIG. 1 are denoted by like numerals.

Reference numerals 14a, 14b, and 14c denote state data interpreting means, while 1a, 1b, and 1c denote data processing systems/apparatuses. The state data interpreting means 14a, 14b, and 14c correspond to the data processing systems/apparatuses 1a, 1b, and 1c, respectively. That is, the types and the number of state data interpreting means to be provided depend on the types and the number of data processing systems/apparatuses.

When the state data of the data processing system/apparatus 1a has been changed, the state data interpreting means 14a obtains and interprets the state data and passes it to the input/output control unit 2. The state data interpreting means 14b, and 14c also obtains and interprets the state data of the data processing systems/apparatuses 1b and 1c, respectively, and pass them to the input/output control unit 2.

Thus, a plurality of state data interpreting means corresponding to the types and the number of the data processing systems/apparatuses are prepared within the input/output control unit 2 beforehand. With this arrangement, the input/output control unit 2 can perform reception processing corresponding to the types and the number of state data even when they have been changed due to a change in the types and the number of employed data processing systems/apparatuses. For example, when it is necessary to change a data processing system/apparatus itself, such as connecting the data processing system/apparatus 1b instead of data processing system/apparatus 1a, all that needs to be done is to connect the data processing system/apparatus 1b to the state data interpreting means 14b. On the other hand, when the input/output function of the data processing system/apparatus 1a is changed, it is only necessary to replace the current state data interpreting means 14a with a corresponding type.

According to the second embodiment described above, the state data interpreting means 14a, 14b, and 14c are provided to obtain and interpret the state data of the predetermined data processing systems/apparatuses 1a, 1b, and 1c, respectively. With this arrangement, when the state data of one of the data processing systems/apparatuses (for example, the data processing system/apparatus 1a) has been changed, the corresponding state data interpreting means (14a) obtains the changed state data from the data processing system/apparatus (1a) and passes it to the input/output control unit 2. Thus, a change on the input side (that is, a change in the state data of each data processing system/apparatus) can be handled by changing one of the state data interpreting means 14a, 14b, and 14c within the input/output control unit 2 (that is, the corresponding change to be made is limited to one specific means within the input/output control unit2). Therefore, when a data processing system/apparatus or its input/output function has been changed, it is only necessary to switch among the state data interpreting means 14a, 14b, and 14c, or replacing a current state data interpreting means with another type. When a data processing system/apparatus has been newly added, on the other hand, all that needs to be done is to add a corresponding state data interpreting means (that is, the corresponding change can be limited to within the input/output control unit 2). Furthermore, the remote display system 6 can retrieve the state data of each of the plurality of different data processing systems/apparatuses 14a, 14b, and 14c by issuing only a single type of request (namely, the attribute data retrieval request) to the input/output control unit 2.

(Third Embodiment)

Figure 6:
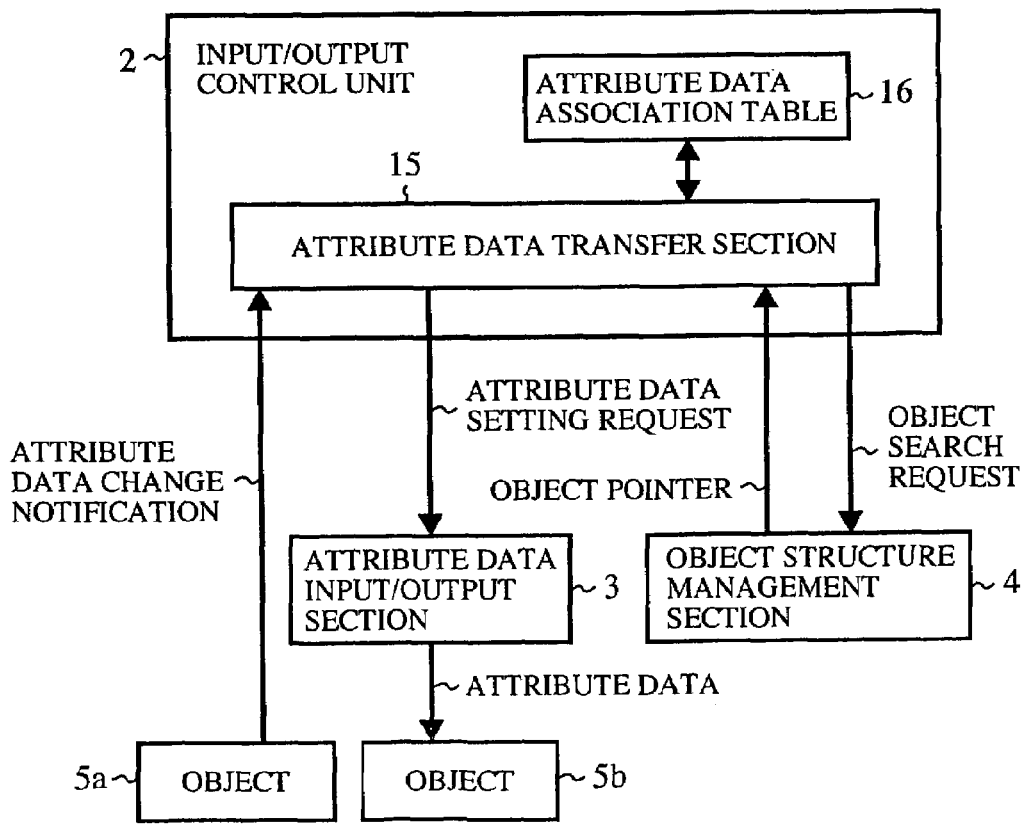
FIG. 6 is a block diagram showing a portion of the configuration of a data server according to a third embodiment of the present invention.

FIG. 6 is a block diagram showing an attribute data transfer section of a data server according to a third embodiment of the present invention. In the figure, the components which are the same as or correspond to those in FIG. 1 are denoted by like numerals. The following description of the third embodiment assumes that there exist only two objects, namely the objects 5a and 5b, within the data server.

Reference numeral 15 denotes an attribute data transfer section for sending an attribute data setting request to the attribute data input/output section 3 after receiving an attribute data change notification from an object. For example, assuming that the attribute data of the object 5a is to be set as the attribute data of the object 5b. The above attribute data change notification includes the object identifier, the object name, and the attribute data of the object 5a, while the attribute data setting request includes an object pointer to the object 5b and the attribute name and the attribute data of the object 5b.

Reference numeral 16 denotes an attribute data association table. Upon receiving an attribute data change notification, the attribute data transfer section 15 refers to the contents of the attribute data association table 16 to determine the object identifier and the attribute name. The attribute data transfer section 15 sends an object search request to the object structure management section 4 and obtains an object pointer in return. This object search request includes the object identifier determined by the attribute data transfer section 15 by searching the attribute data association table 16.

Figure 7:
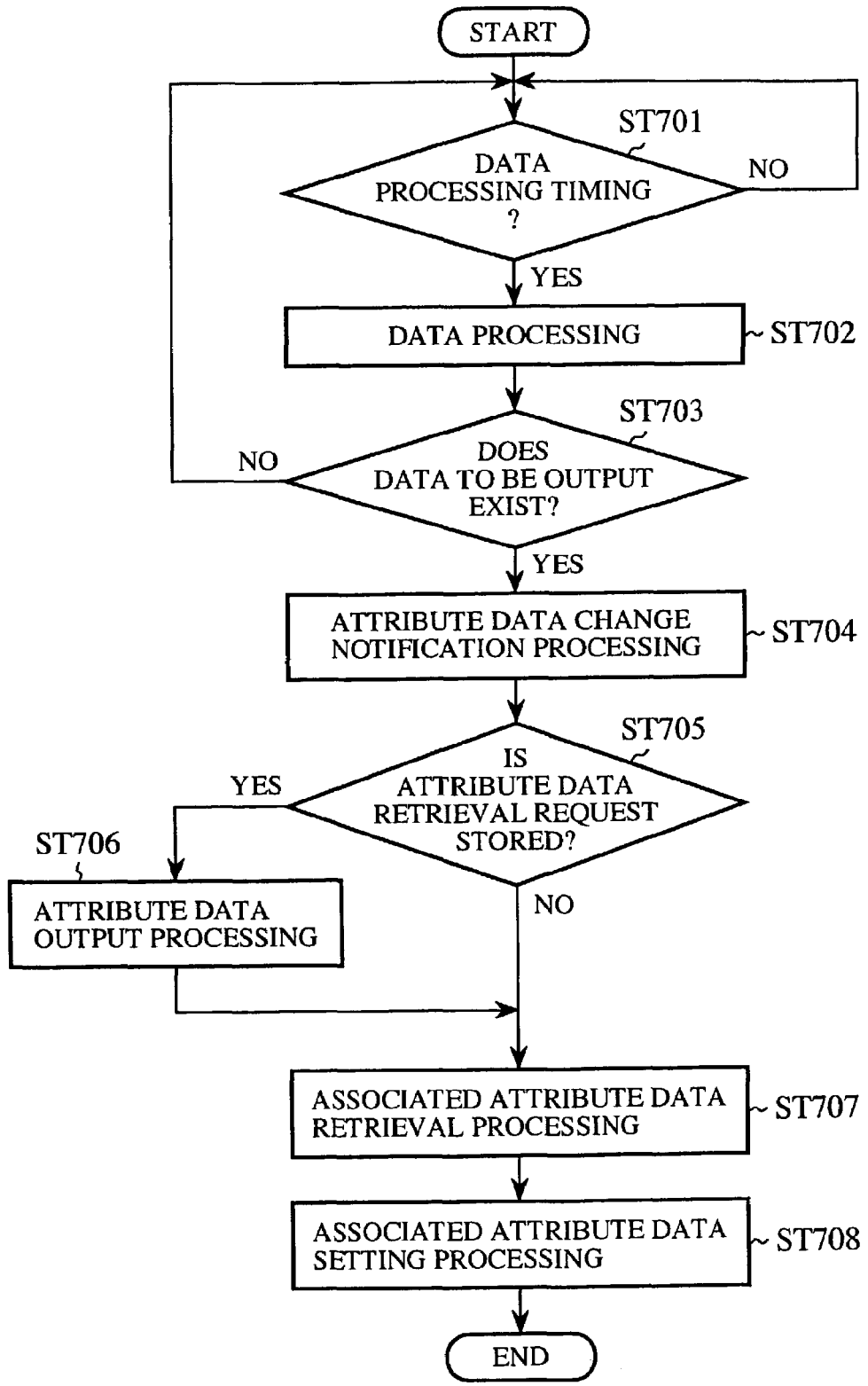
FIG. 7 is a flowchart showing an attribute data transfer procedure used by the data server according to the third embodiment.

FIG. 7 is a flowchart showing the attribute data transfer procedure employed by the data server according to the third embodiment of the present invention. Description will be made below of operation in which attribute data of the object 5a is set as attribute data of the object 5b.

First of all, it is determined whether the current timing is a data processing timing at step ST701. This determination is made when, for example, attribute data of the object 5a has been set, a time registered in the object 5a beforehand has come, or a determination condition preset in the object 5a has become true. If it is determined that the current timing is a data processing timing, data processing is carried out at step ST702. This data processing may be any processing available with the object 5a. The following are some examples: when attribute data is expressed by numerical values, the unit of the numerical values is converted; it is determined whether the numerical values are between the upper and lower limits preset in the object 5a, and a flag is updated based on the determination result; an operation is performed between one type of attribute data and another type of attribute data (not shown) of the object 5a, and the result is set as still another type of attribute data (not shown) of the object 5a; and attribute data is stored in a database and so on.

Then, it is determined whether any data to be output exists in the object 5a at step ST703. If data to be output exists, attribute data change notification processing is carried out at step ST704. In this attribute data change notification processing, the object 5a sends an attribute data change notification to the attribute data transfer section 15. This attribute data change notification includes the object identifier, an attribute name, and attribute data of the object 5a. After the attribute data change notification processing is carried out, it is determined whether any attribute data retrieval request is stored at step ST705. Specifically, to make this determination, step ST705 searches all stored attribute data retrieval requests, checking whether the pair of the object identifier and the object name included in each attribute data retrieval request are the same as that included in the attribute data change notification. If both are the same, it is determined that the attribute data retrieval request is valid and attribute output processing is carried out. The attribute data is returned to the remote display system 6 which sent the attribute data retrieval request determined as valid, at step ST706.

Figures 8, 9:
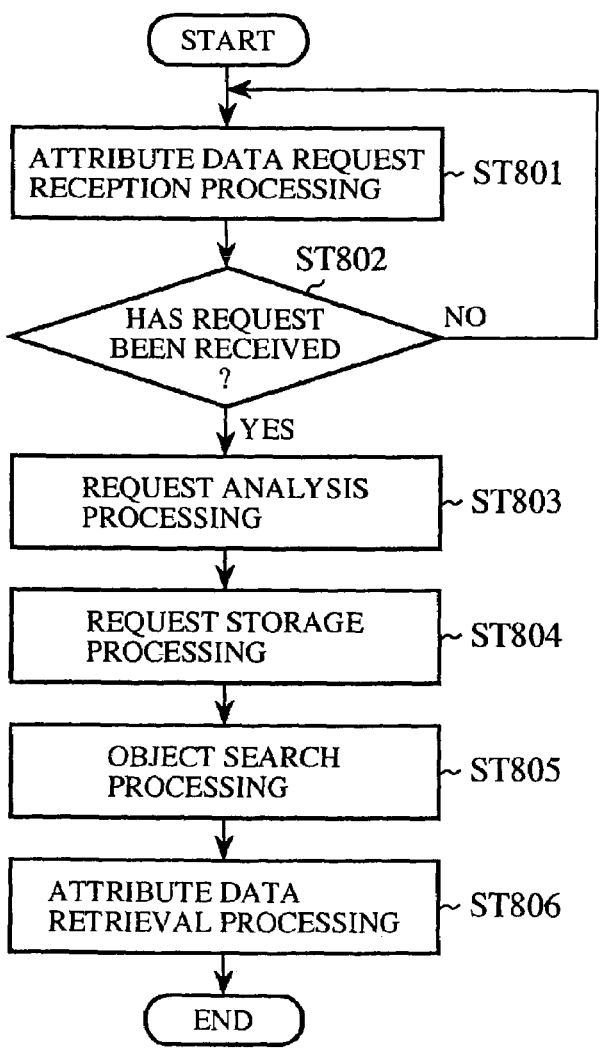
FIG. 8 is an explanatory diagram illustrating an attribute data association table of the data server according to the third embodiment.
FIG. 9 is a flowchart showing a request storage procedure used by the data server according to the third embodiment.

Then, associated attribute data retrieval processing is carried out at step ST707. Specifically, the following retrieval processing is performed based on the attribute data change notification. The attribute data transfer section 15 refers to the contents of the attribute data association table 16 to search for the object identifier and the attribute name of the object 5*a* included in the attribute data change notification. For example, the attribute data association table 16 is configured as indicated in FIG. 8. If the attribute data change notification includes the object identifier 16*a* and the attribute name 16*b* of the object 5*a*, the attribute data transfer section 15 searches the attribute data association table 16 using the object identifier 16*a* and the attribute name 16*b* as keys, and extracts the object identifier 16*c* and the attribute name 16*d*. For example, here, the object identifier 16*c* is the identifier of the object 5*b*, and the attribute name 16*d* is the attribute name of attribute data of the object 5*b*. The attribute data transfer section 15 then sends an object search request to the object structure management section 4 to obtain an object pointer based on the object identifier 16*c* included in the request.

Subsequently, associated attributed data setting processing is carried out at step ST708. The attribute data transfer section 15 sends an attribute data setting request to the attribute data input/output section 3 which then sets attribute data of an object by processing the request. For example, when the object identifier 16*c* and the attribute name 16*d* have been obtained at step ST707, the attribute data setting request includes an object pointer obtained as a result of a search based on the object identifier 16*c*, the attribute name 16*d*, and the attribute data included in the attribute data change notification. A specific example of the operation carried out by the attribute data input/output section 3 in this case is described as follows. When the Java® programming language, in which a method can be dynamically called, is used, a simple rule is established to generate the name of a method for updating the attribute data, based on the attribute name 16*d*. For example, the character string "set" is added to the beginning of the attribute name 16*d* to produce the method name. The attribute data input/output section 3 then obtains the class definition of the object by use of the object pointer, and uses the class definition and the method name to obtain a method object. After that, the attribute data input/output section 3 passes the object pointer and the attribute data to the obtained method object to execute the method.

FIG. 9 is a flowchart showing the request storage procedure employed by the data server according to the third embodiment of the present invention. Description will be made of operation in which the input/output control unit 2 processes an attribute data retrieval request received from the remote display system 6, and returns attribute data of an object to the remote display system 6 as well as storing the attribute data retrieval request.

Upon receiving an attribute data retrieval request from the remote display system 6, the input/output control unit 2 carries out reception processing on the request at step ST801. At step 802, it is determined whether any attribute data retrieval request has been received. If an attribute data retrieval request has been received, request analysis processing is carried out to obtain the object identifier and the attribute name from the attribute data retrieval request at step ST803.

Then, at step ST804, request storage processing is carried out to store the object identifier and the attribute name obtained at step ST803. After the request storage processing has been completed, object search processing is carried out at step ST805. In this object search processing, the input/output control unit 2 issues an object search request to the object structure management section 4 which then returns an object pointer to the input/output control unit 2. This object search request includes, for example, an object identifier and an attribute name.

Upon receiving the object pointer, the input/output control unit 2 performs attribute data retrieval processing at step ST806. In this attribute data retrieval processing, for example, the input/output control unit 2 passes the attribute data retrieval request to the attribute data input/output section 3 which then retrieves attribute data of an object and sends it to the input/output control unit 2. The input/output control unit 2 passes the received attribute data to the remote display system 6.

As described above, the third embodiment employs the attribute data transfer section 15 and performs the following steps. The object 5*a* performs data processing; the object 5*a* issues a change notification to the attribute data transfer section 15; the attribute data transfer section 15 determines whether there is any stored attribute data retrieval request whose object identifier and attribute name are the same as those included in the change notification; and if there is, the attribute data transfer section 15 returns the attribute data to the remote display system 6. Furthermore, related objects are searched, and the attribute data transfer section 15 sets all or part of the attribute data of each related object. With this arrangement, the data server can process data, and the attribute data transfer section 15 can set the processing result as attribute data of another object 5*b*. Therefore, it is possible to carry out complicated data processing using a plurality of objects. Since a data processing result is set as attribute data of an object, the remote display system 6 can retrieve attribute data of any object by sending an attribute data retrieval request to the input/output control unit 2. Furthermore, even if the remote display system 6 sends an attribute data retrieval request only once, the system can continuously obtain updated attribute data. As a result, the remote display system 6 can obtain the data which the input/output function of the data processing system/apparatus 1 does not support, such as an intermediate result of data processing, without changing the data processing system/apparatus 1.

(Fourth Embodiment)

Figure 10:
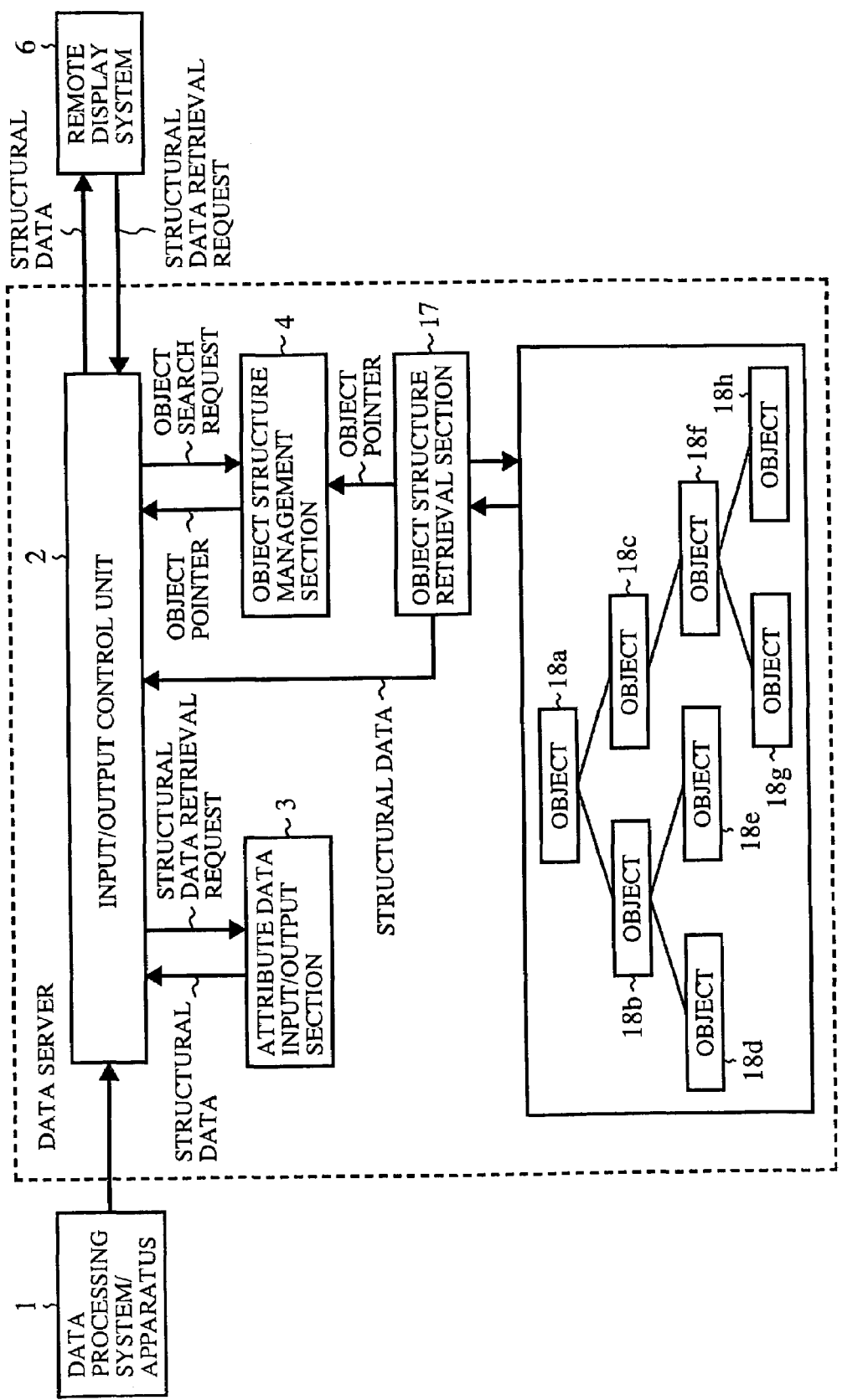
FIG. 10 is a block diagram showing the configuration of a data server according to a fourth embodiment of the present invention.

FIG. 10 is a block diagram showing a data server according to a fourth embodiment of the present invention. In the figure, the components which are the same as or correspond to those in FIG. 1 are denoted by like numerals. Reference numeral 17 denotes an object structure retrieval section for, when the object structure management section 4 searches for an object, going through a physical object structure to search for and extract the target object. The object structure retrieval section 17 is also used by the input/output control unit 2 to obtain a list of attribute names. Reference numerals 18*a* to 18*h* denotes objects collectively forming a tree structure in which the object 18*a* is the root.

Figure 11:
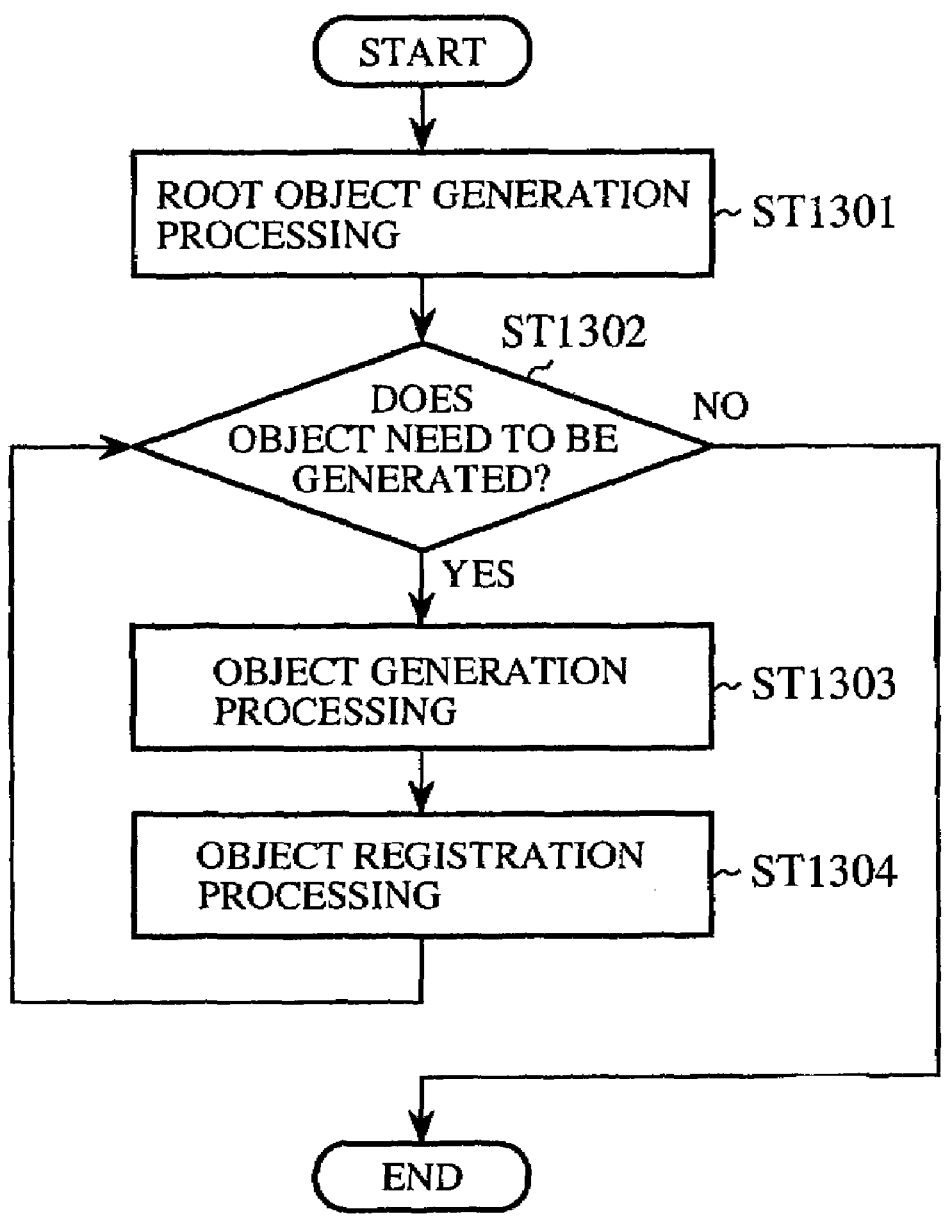
FIG. 11 is a flowchart showing an object structure formation procedure used by the data server according to the fourth embodiment.

FIG. 11 is a flowchart showing the object structure formation procedure employed by the data server according to the fourth embodiment of the present invention.

At step ST1301, root object generation processing is carried out. In the example of FIG. 10, the root object 18*a* is generated. At step ST1302, it is determined whether the next object is to be generated. If the next object is to be generated, object generation processing is carried out to generate an object and determine the name of the object and an object pointer at step ST1303. Then, object registration processing is performed at step ST1304. In this object registration processing, the generated object is registered with another object. The registering object is referred to as the parent object of the registered object, while the registered object is referred to as a child object of the registering object. For example, in FIG. 10, the objects 18b and 18c are registered with the object 18a and therefore the parent object of the objects 18b and 18c is the object 18a. Other objects 18d and 18e are registered with the object 18b, and therefore child objects of the object 18b are the objects 18d and 18e.

The name of each child object determined at step ST1303 is such that it is unique among the child objects having the same parent object. The object identifier of an object included in the physical object structure generated in the above process is expressed by a character string obtained as a result of concatenating the object names of objects (child objects) sequentially traced when going through the structure starting from the root object up to the target object, and separating the object names in the character string from one another by a delimiter.

The object structure retrieval section 17 searches for an object by going through the physical object structure based on an object identifier provided by the object structure management section 4. This search operation will be described below.

The object structure retrieval section 17 constantly holds an object pointer to the root object 18a. Each object, on the other hand, holds its object name, a list of the object names of its child objects, and a list of object pointers to the child objects as attribute data. The object structure retrieval section 17 separates, one by one, each of the object names which are included in a given object identifier and separated from one another by a delimiter. If the first separated object name is the same as that of the root object 18a, the object structure retrieval section 17 selects the child object of the object 18a whose object name is the same as the second separated object name (the next object name). Then, the child object of the selected child object whose object name is the same as the third separated object name is selected. The above process is repeated until no more object name is included in the object identifier, and the object pointer to the finally selected object is returned to the object structure management section 4.

The object structure retrieval section 17 also performs the following operation to obtain a list of the attribute names of an object.

Upon receiving an object identifier and an attribute name from the object structure management section 4, the object structure retrieval section 17 searches for an object based on the object identifier. Specifically, the object structure retrieval section 17 obtains an object pointer to the object, and determines whether the object has the attribute indicated by the attribute name. If the object has the attribute, the object structure retrieval section 17 returns the object pointer. Otherwise, the object structure retrieval section 17 returns an error.

When the object structure retrieval section 17 has received an object identifier alone from the object structure management section 4, on the other hand, the object structure retrieval section 17 searches for an object based on the object identifier, obtains an object pointer to the object, and returns a list of the attribute names of the object. At that time, the object structure retrieval section 17 determines whether the object has the attribute indicated by each attribute name.

In this case, for example, when the Java® programming language, in which a class definition can be dynamically obtained, was used to create the program for obtaining a list of the attribute names of an object, the class definition may be obtained using the object pointer in order to determine whether the (target) object has the attribute indicated by each attribute name and obtain the list of the attribute names of the object.

Figure 12:
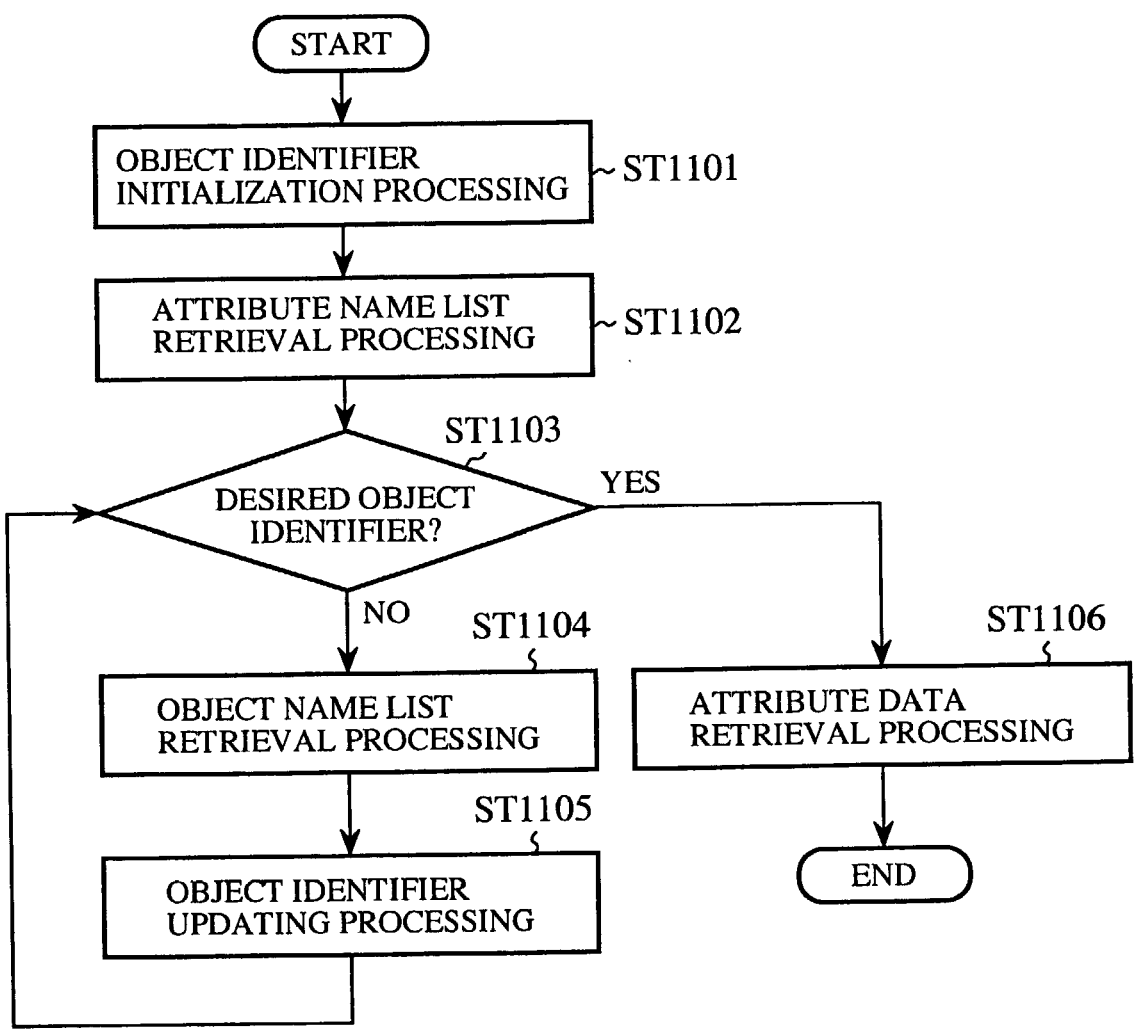
FIG. 12 is a flowchart showing a data retrieval procedure performed by a remote display system according to the fourth embodiment.

FIG. 12 is a flowchart showing the data retrieval procedure employed by a remote display system according to the fourth embodiment of the present invention. Using this procedure, the remote display system 6 can retrieve attribute data of a desired object without obtaining information on the object and the attributes beforehand.

First of all, object identifier initialization processing is carried out at step ST1101. The remote display system 6 sets the object identifier of the root object as the identifier of a target object. Then, when the input/output control unit 2 has received a structural data retrieval request including the identifier of the target object from the remote display system 6, attribute name list retrieval processing is carried out at step ST1102. At step 1103, it is determined whether the identifier of the target object is that of a desired object. If it is the identifier of the desired object, attribute data retrieval processing is carried out at step ST1106.

If it is not the identifier of the desired object, on the other hand, object name list retrieval processing is carried out at step ST1104. In this object name list retrieval processing, the attribute name "child object name list" is selected from a list of attribute names, and an attribute data retrieval request including the identifier of the target object and the attribute name is sent to the input/output control unit 2. The remote display system 6 obtains the child object name list. Then, object identifier updating processing is carried out at step ST1105. In this object identifier updating processing, a desired object name is selected from the child object name list, and the identifier of the target object and the selected object name are concatenated with a delimiter in between to produce a new object identifier. After that, the produced new object identifier is set as the identifier of the target object, and step ST1103 is carried out again based on the updated identifier of the target object. In the attribute data retrieval processing at step ST1106, a desired attribute name is selected from a list of attribute names, and an attribute data retrieval request including the identifier of the target object (which is the object identifier of the desired object) and the selected attribute name is sent to the input/output control unit 2. Then, the attribute data input/output section 3 retrieves the attribute data which is then sent to the remote display system 6.

As described above, the fourth embodiment employs the following steps. The object structure retrieval section 17 searches for an object while going through a physical object structure; and when the input/output control unit 2 has received a structural data retrieval request from the remote display system 6, the object structure management section 17 searches for a target object, obtains a list of the attribute names of the object, and returns it to the remote display system 6. Therefore, the remote display system 6 can send a structural data retrieval request to the input/output control unit 2 to obtain a list of the attribute names of a given object, and then send a new structural data retrieval request generated from the obtained list of the attribute names. With this arrangement, the remote display system 6 can obtain information on the attribute data of an object after it was activated. Thus, the remote display system 6 need not read state data information such as a state data list for the data processing system/apparatus 1 before it is activated. Furthermore, an input/output function dedicated for retrieving state data information need not be added to both the data processing system/apparatus 1 and the remote display system 6.

(Fifth Embodiment)

Figures 13, 14:
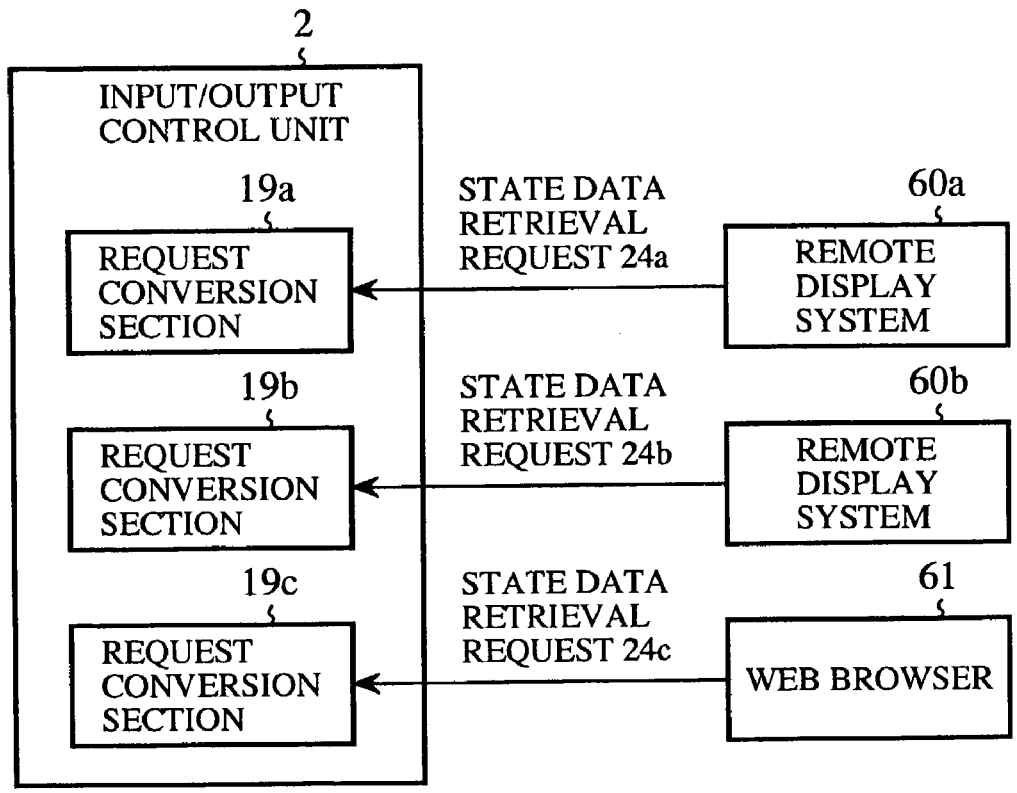
FIG. 13 is a block diagram showing a portion of the configuration of a data server according to a fifth embodiment of the present embodiment.
FIG. 14 is an explanatory diagram illustrating a state data management table of the data server according to the fifth embodiment.

FIG. 13 is a block diagram showing a portion of the configuration of a data server according to a fifth embodiment of the present invention. In the figure, the components which are the same as or correspond to those in FIG. 1 are denoted by like numerals. Reference numerals 19*a*, 19*b*, and 19*c* denote request conversion section provided within the input/output control unit 2. Even though this example indicates the three request conversion section 19*a*, 19*b*, and 19*c* which correspond to remote display systems 60*a* and 60*b* and a Web browser 61, the present invention is not limited to this specific number of request conversion section. The appropriate number of request conversion section is determined based on the number of remote display systems and Web browsers to be employed.

Note the remote display system 60*a* and the request conversion section 19*a* in the figure. They form a system dedicated for the data processing system/apparatus 1*a*. The remote display system 60*a* sends to the request conversion section 19*a* a state data retrieval request 24*a* corresponding to the input/output function of the data processing system/apparatus 1*a*. The request conversion section 19*a* converts the state data retrieval request 24*a* into an attribute data retrieval request and sends it to the input/output control unit 2. A specific example of the operation carried out by the request conversion section 19*a* is as follows. The request conversion section 19*a* extracts the identifier of state data 12*a* from the state data retrieval request 24*a* and searches the state data management table 12 shown in FIG. 3 using the state data 12*a* as a key to extract an object identifier 12*b* and an attribute name 12*c*.

Note the remote display system 60*b* and the request conversion section 19*b*, on the other hand. They form a system which does not correspond to any data processing system/apparatus, or which corresponds to the data processing system/apparatus 1*a* but is dedicated for retrieving state data not supported by the input/output function of the data processing system/apparatus 1*a*. Upon receiving a state data retrieval request 24*b* sent from the remote display system 60*b*, the request conversion section 19*b* converts the state data retrieval request 24*b* into an attribute data retrieval request and sends it to the input/output control unit 2. An example of the operation carried out by the request conversion section 19*b* at that time is described as follows. The request conversion section 19*b* extracts the identifier of state data 13*a* from the state data retrieval request 24*b*. Here, assume that the state data 13*a* is not supported by the input/output function of the data processing system/apparatus 1*a*. The request conversion section 19*b* fails to successfully search the state data management table 12 shown in FIG. 3 using the identifier of the state data 13*a* as a key. The request conversion section 19*b* then searches another state data management table 13 shown in FIG. 14 using the identifier of the state data 13*a* as a key and extracts an object identifier 13*b* and an attribute name 13*c*.

It should be noted that the state data management table 13 is different from the state data management table 12 in that, while the state data management table 12 is also used to specify an object attribute corresponding to the state data 12*a* sent from the data processing system/apparatus 1*a*, the state data management table 13 is used by only the request conversion section 19*b*.

Figures 15, 16:
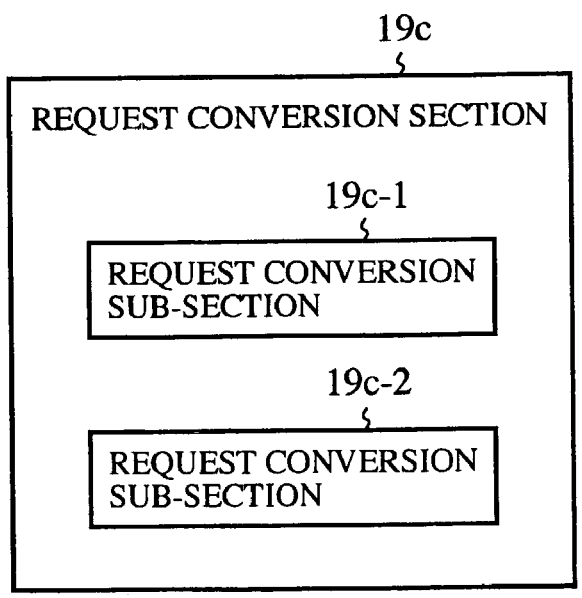
FIG. 15 is an explanatory diagram illustrating the structure of a generic data retrieval request performed by the data server according to the fifth embodiment.
FIG. 16 is a block diagram showing the internal configuration of a request conversion section of the data server according to the fifth embodiment.

Furthermore, note the Web browser 61 and the request conversion section 19*c*. The Web browser 61 sends a generic data retrieval request 25 to the request conversion section 19*c*. The generic data retrieval request 25 is created by use of HTTP (Hypertext Transfer Protocol), which is a standard data retrieval form on the Internet. The request conversion section 19*c* converts the received generic data retrieval request 25 into an attribute data retrieval request and sends it to the input/output control unit 2. For example, the generic data retrieval request 25 has a structure as shown in FIG. 15. In the figure, the generic data retrieval requests 25-1 and 25-2 each indicates a different structure example.

FIG. 16 is a block diagram showing the internal configuration of the request conversion section 19*c* of the data server. The request conversion section 19*c* comprises request conversion sub-section 19*c*-1 and 19*c*-2. Even though the figure indicates only two request conversion sub-section, any appropriate number of request conversion sub-section may be employed as necessary.

For example, the request conversion section 19*c* operates as follows. Assume that the generic data retrieval request 25 is configured in the same way as the generic data retrieval request 25-1 shown in FIG. 15. The request conversion section 19*c* extracts the identifier of the request conversion section included in the data path indication portion, obtaining (the identifier of) the request conversion sub-section 19*c*-1, and then sends the query indication portion included in the generic data retrieval request 25-1 to the request conversion sub-section 19*c*-1. The request conversion sub-section 19*c*-1 reads an object identifier and an attribute name from the query indication portion and converts them into an attribute data retrieval request. At that time, if no attribute name is included in the query indication portion, the request may be regarded as a structural data retrieval request and converted into a structural data retrieval request. The request conversion sub-section 19*c*-1 may be implemented by employing a program created based on CGI (Common Gateway Interface), or a servlet of the Java® programming language.

Another example of the operation carried out by the request conversion section 19*c* is described below. Assume that the generic data retrieval request 25 is configured in the same way as the generic data retrieval request 25-2 shown in FIG. 15. The request conversion section 19*c* extracts the object identifier and the attribute name included in the data path indication portion, and converts them into an attribute data retrieval request. At that time, if no attribute name is included in the data path indication portion, the request may be regarded as a structural data retrieval request and converted into a structural data retrieval request.

As described above, the fifth embodiment employs the following steps. When the input/output control unit has received a state data retrieval request for the data processing system/apparatus 1 or a generic data retrieval request sent from the remote display system 6, the corresponding request conversion section 19*a*, 19*b*, or 19*c* converts the request into an attribute data retrieval request or a structural data retrieval request; if the received request was converted into an attribute data retrieval request at the previous step, the object structure management section 4 searches for a target object, and the attribute data input/output section 3 retrieves the attribute data of the target object and returns it to the remote display system; and if the received request was converted into a structural data retrieval request, on the other hand, the object structure management section 4 searches for a target object, and the object structure retrieval section 17 retrieves a list of the attribute names of the target object and returns it to the remote display system. With this arrangement, it is possible to retrieve state data based on a standard data retrieval request issued from a standard tool such as a Web browser without changing the data processing system/apparatus 1.

(Sixth Embodiment)

Figure 17:
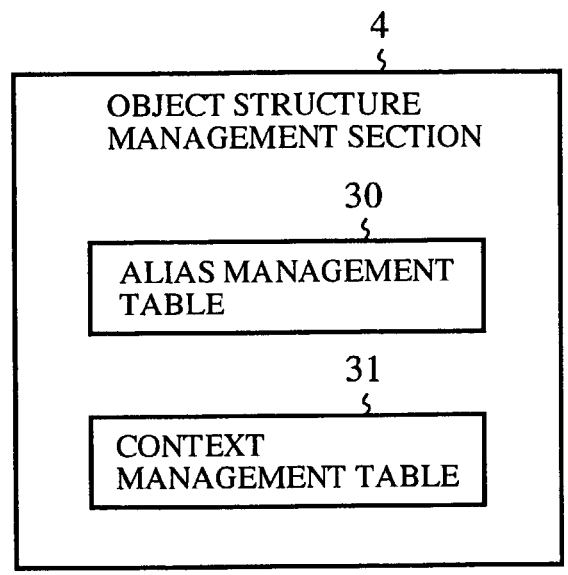
FIG. 17 is a block diagram showing a portion of the configuration of a data server according to a sixth embodiment of the present invention.

FIG. 17 is a block diagram showing the configuration of the object structure management section of a data server according to a sixth embodiment of the present invention. In the figure, the components which are the same as or correspond to those in FIG. 1 are denoted by like numerals. Reference numeral 30 denotes an alias name management table, while 31 denotes a context management table.

According to the sixth embodiment, the object structure management section 4 manages a plurality of logical object structures, and upon receiving an object search request including a logical object identifier, searches for a target object while converting the logical object identifier by referring to the alias name management table 30 and the context management table 31, and returns an object pointer to the object.

Figure 18:
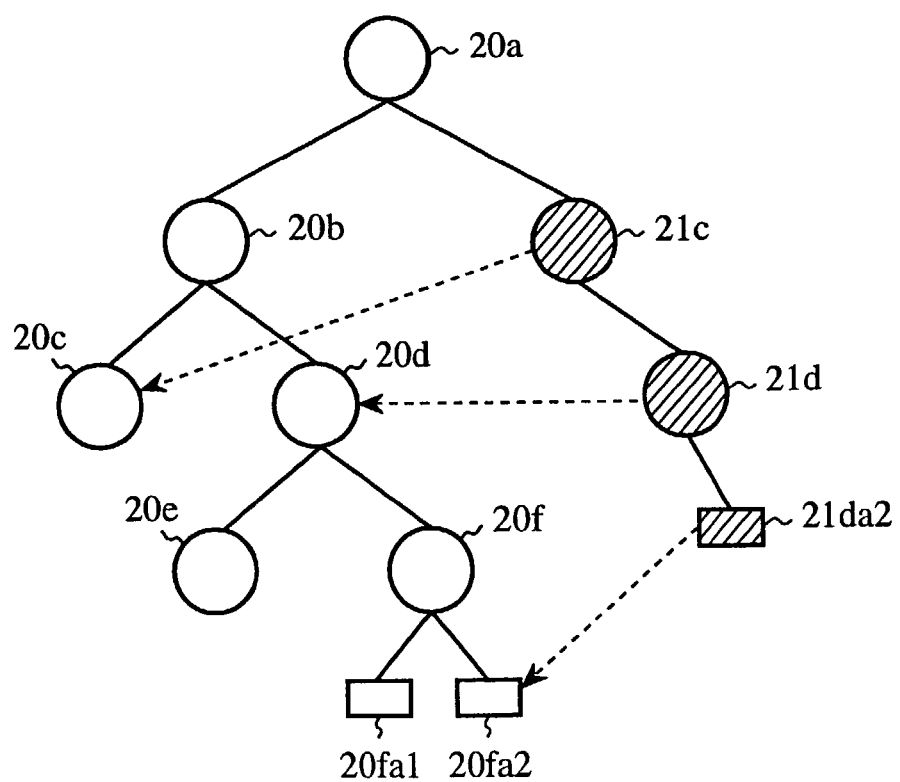
FIG. 18 is an explanatory diagram illustrating a logical object structure using alias names employed by the data server according to the sixth embodiment.

FIG. 18 is an explanatory diagram illustrating a logical object structure using alias names according to the sixth embodiment. The object structure management section 4 creates a logical object structure by use of the alias management table 30. In the figure, reference numerals 20*a*, 20*b*, . . . , and 20*f* denote objects. The object identifiers of these objects are denoted by reference numerals N20*a*, N20*b*, . . . , and N20*f*, respectively. Reference numerals 20*fa*1 and 20*fa*2 denote attribute data of the object 20*f*. The attribute names of the attribute data 20*af*1 and the attribute data 20*af*2 are denoted by reference numerals N20*fa*1 and N20*fa*2, respectively. Reference numerals 21*c* and 21*d* denote logical objects. The logical object identifiers of the logical objects 21*c* and 21*d* are denoted by reference numerals VN21*c* and VN21*d*. Reference numeral 21da2 denotes logical attribute data. The logical attribute name of the logical attribute data 21*da*2 is denoted by reference numeral VN21*da*2.

For example, upon receiving an object search request including the logical object identifier VN21*c*, the object structure management section 4 goes through the object structure shown in FIG. 18 to search for a target object and, as a result, returns an object pointer to the object 20*c* to the input/output control unit 2. When the object structure management section 4 has received an object search request including the logical object identifier VN21*d*, on the other hand, the object structure management section 4 returns an object pointer to the object 20*d*. If the object structure management section 4 is supplied with an object search request including the logical object identifier VN21*d* and the logical attribute name VN21*da*2, the object structure management section 4 returns an object pointer to the object 20*f* and the attribute name N20*fa*2.

Figure 19:
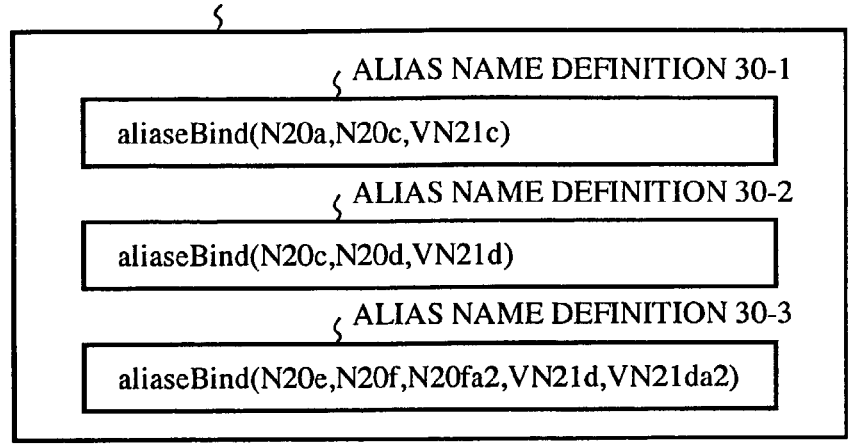
FIG. 19 is an explanatory diagram illustrating the structure of an alias name management table of the data server according to the sixth embodiment.

In order for the object structure management section 4 to carry out processing as described above, definition information may be added to the alias management table 30 as indicated in FIG. 19. In the figure, reference numerals 30-1, 30-2, and 30-3 each denote a separate alias name definition. Note the alias name definition 30-1. The alias name definition 30-1 is made up of the object identifier N20*a*, the object identifier N20*c*, and the logical object identifier VN21*c*. This combination indicates (defines) that (with the logical object identifier VN21*c* given), the object structure management section 4 searches for a target object while going through the object structure shown in FIG. 18 starting from the object 20*a* and returns an object pointer to the object 20*c*.

Next, note the alias name definition 30-3. The alias name definition 30-3 is made up of the object identifier N20*e*, the object identifier N20*f*, the attribute name N20*fa*2, the logical object identifier VN21*d*, and the logical attribute name VN21*da*2. This combination indicates (defines) that (with the logical object identifier VN21*d* and the logical attribute name VN21*da*2 given), the object structure management section 4 searches for a target object while going through the object structure shown in FIG. 18 starting from the object N20*e* and returns an object pointer to the object 20*f* and the attribute name N20*fa*2.

Figure 20:
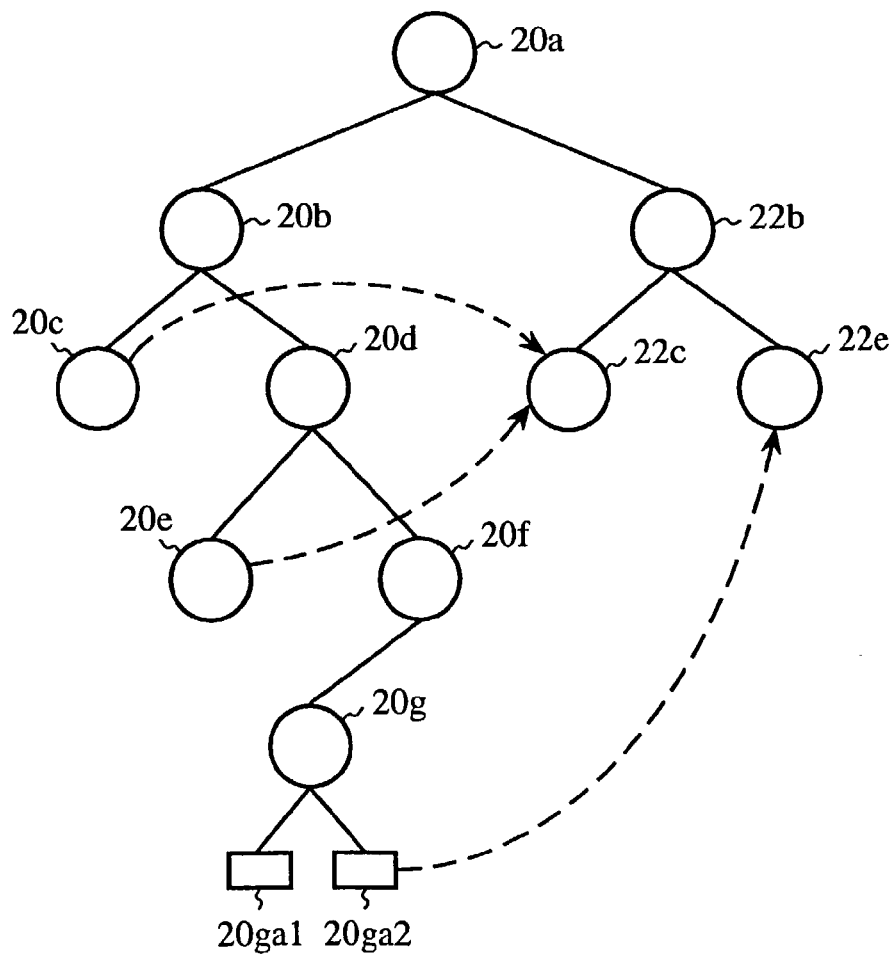
FIG. 20 is an explanatory diagram illustrating a logical object structure using contexts employed by the data server according to the sixth embodiment.

FIG. 20 is an explanatory diagram illustrating a logical object structure using contexts employed by the data server according to the sixth embodiment. The object structure management section 4 creates a logical object structure by use of the context management table 31. In the figure, reference numerals 20*a*, 20*b*, . . . , and 20*g* and 22*b*, 22*c*, and 22*e* denote objects. The object identifiers of these objects are denoted by reference numerals N20*a*, N20*b*, . . . , and N20*g* and N22*b*, N22*c*, and N22*e*, respectively. Reference numerals 20*ga*1 and 20*ga*2 denote attribute data of the object 20*g*. The attribute names of the attribute data 20*ga*1 and the attribute data 20*ga*2 are denoted by reference numerals N20*ga*1 and N20*ga*2.

For example, upon receiving a logical object identifier N20*c*-C1 made up of the object identifier N20*c* and a context identifier C1, the object structure management section 4 goes through the object structure shown in FIG. 20 to search for a target object and returns an object pointer to the object 22*c*. On the other hand, if the object structure management section 4 has received a logical object identifier N20*g*-N20*ga*2-C1 made up of the object identifier N20*g*, the attribute name N20*ga*2, and the context identifier C1, the object structure management section 4 returns an object pointer to the object 22*e*.

In order for the object structure management section 4 to carry out processing as described above, definition information may be added to the context management table 31 as indicated in FIG. 21. In the figure, reference numerals 31-1, 31-2, and 31-3 each denote a separate context definition. Note the context definition 31-1, for example. The context definition 31-1 is made up of the object identifier N22*c*, the object identifier N20*c*, and the context identifier C1. This combination indicates (defines) that (with the logical object identifier N20*c*-C1 given), the object structure management section 4 searches for a target object while going through the object structure shown in FIG. 20 and returns an object pointer to the object 22*c*.

In the sixth embodiment, let us consider that attribute data and structural data are retrieved based on a logical object identifier after receiving the generic data retrieval request 25 from the Web browser 61 as shown in FIG. 13. For such a case, the generic data retrieval request 25 may have a structure as shown in FIG. 22. In FIG. 22, the generic data retrieval requests 25-11 and 25-12 are different structural examples. When alias-name logical object identifiers are handled, a method similar to that employed by the fifth embodiment is applied in which a generic data retrieval request is converted into an attribute data retrieval request or a structural data retrieval request. When context logical object identifiers are handled, on the other hand, a context identifier is specified in the query indication portion as indicated in the generic data retrieval requests 25-11 and 25-12 in FIG. 22. With this arrangement, the request conversion section 19*c* extracts the context identifier and converts the generic data retrieval request into an attribute data retrieval request or a structural data retrieval request including a context logical object identifier.

Since the sixth embodiment manages a logical object structure using alias names in addition to a physical object structure, it is possible to define relationships between logical objects as well as a relationship between attribute data of one logical object and that of another separately from the physical object structure. Therefore, it is possible to define a logical object structure based on requests to be made by a remote display system while maintaining such functions as a data holding function and a data processing function realized by employing a physical object structure, and a function in which a remote display system can retrieve any attribute data of any object without knowing the physical object structure beforehand. For example, a remote display system can define a simplified logical object structure in which each type of attribute data which the remote display system needs to monitor is given an alias name and registered.

Furthermore, since the sixth embodiment also manages a logical object structure using contexts in addition to a physical object structure, it is possible to associate an object in one partial object structure with an object in another, or attribute data in one partial object structure with attribute data in another based on contexts. Therefore, contexts for an object identifier can be switched to obtain associated attribute data.

Figure 23:
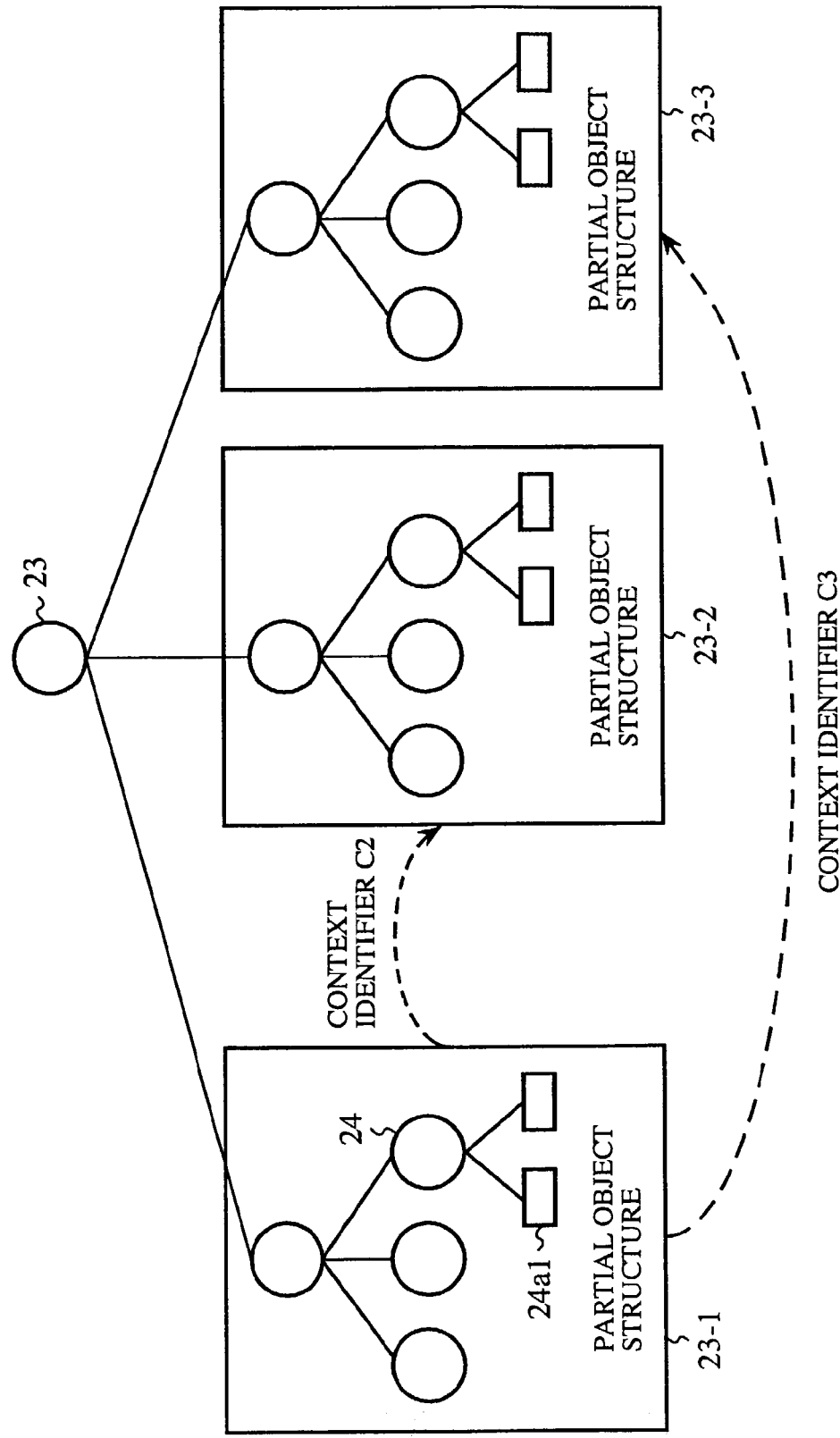
FIG. 23 is an explanatory diagram illustrating a logical object structure using contexts employed by the data server according to the sixth embodiment.
Figure 24:
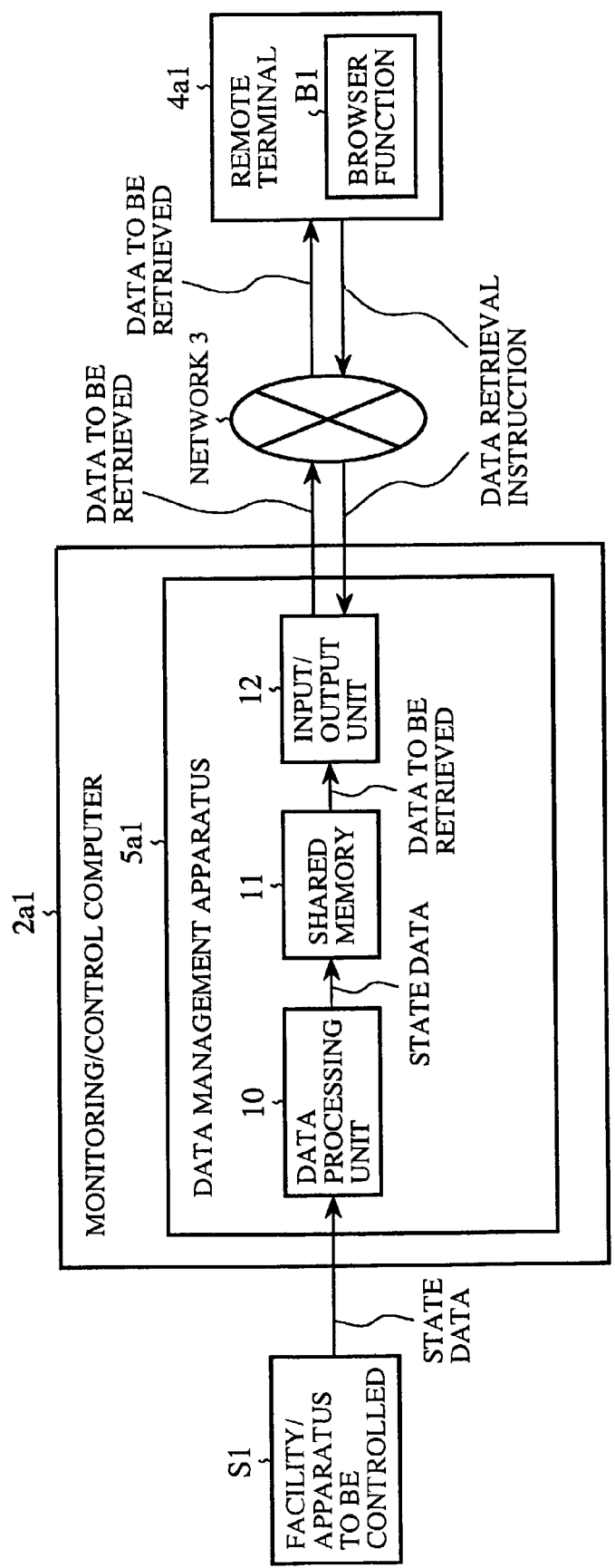
FIG. 24 is a block diagram schematically showing the configuration of a conventional monitoring/control system made up of a plurality of monitoring/control apparatuses.
Figure 25:
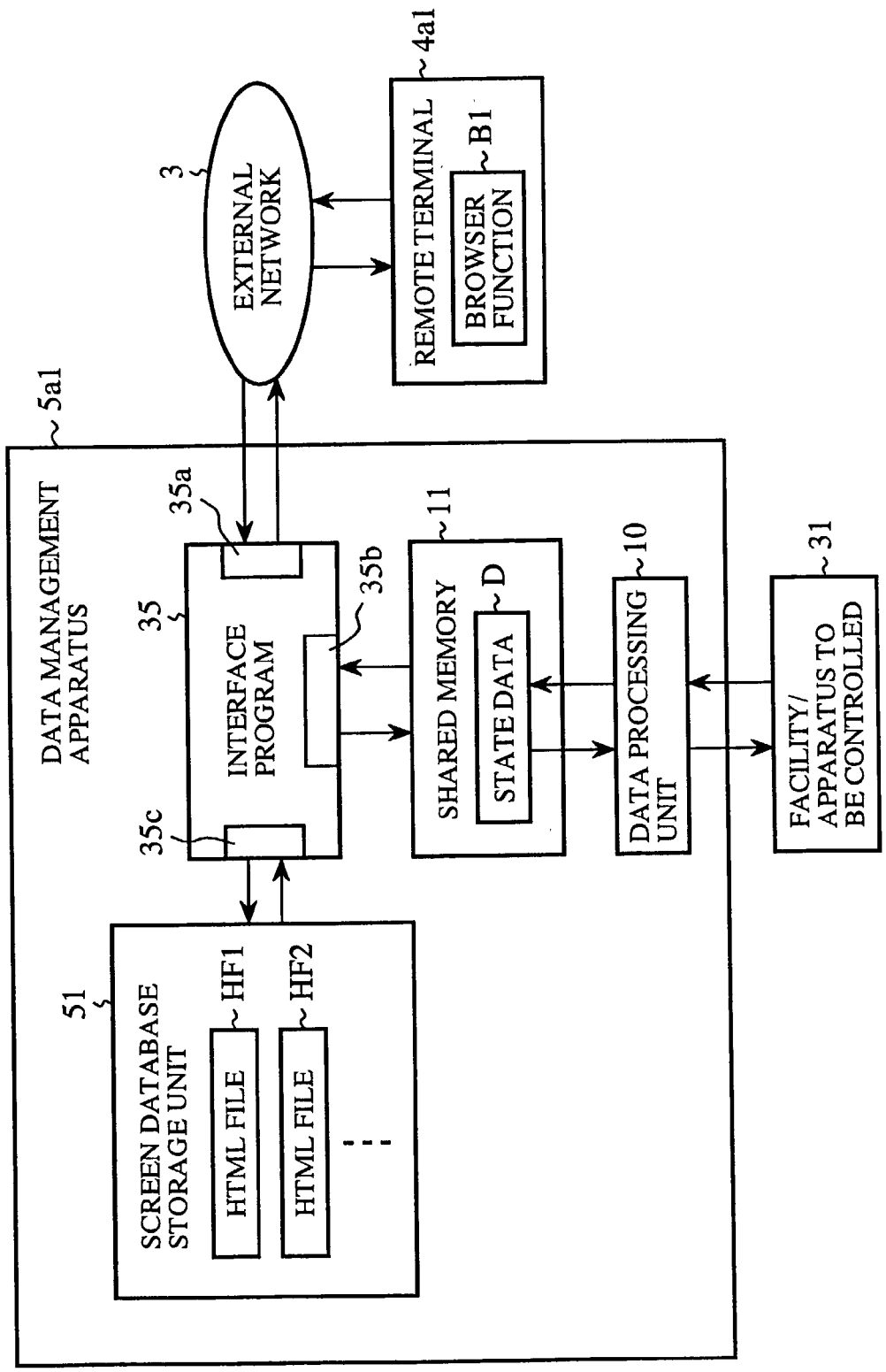
FIG. 25 is a block diagram showing the internal configuration of the conventional monitoring/control system shown in FIG. 24.
Figure 26:
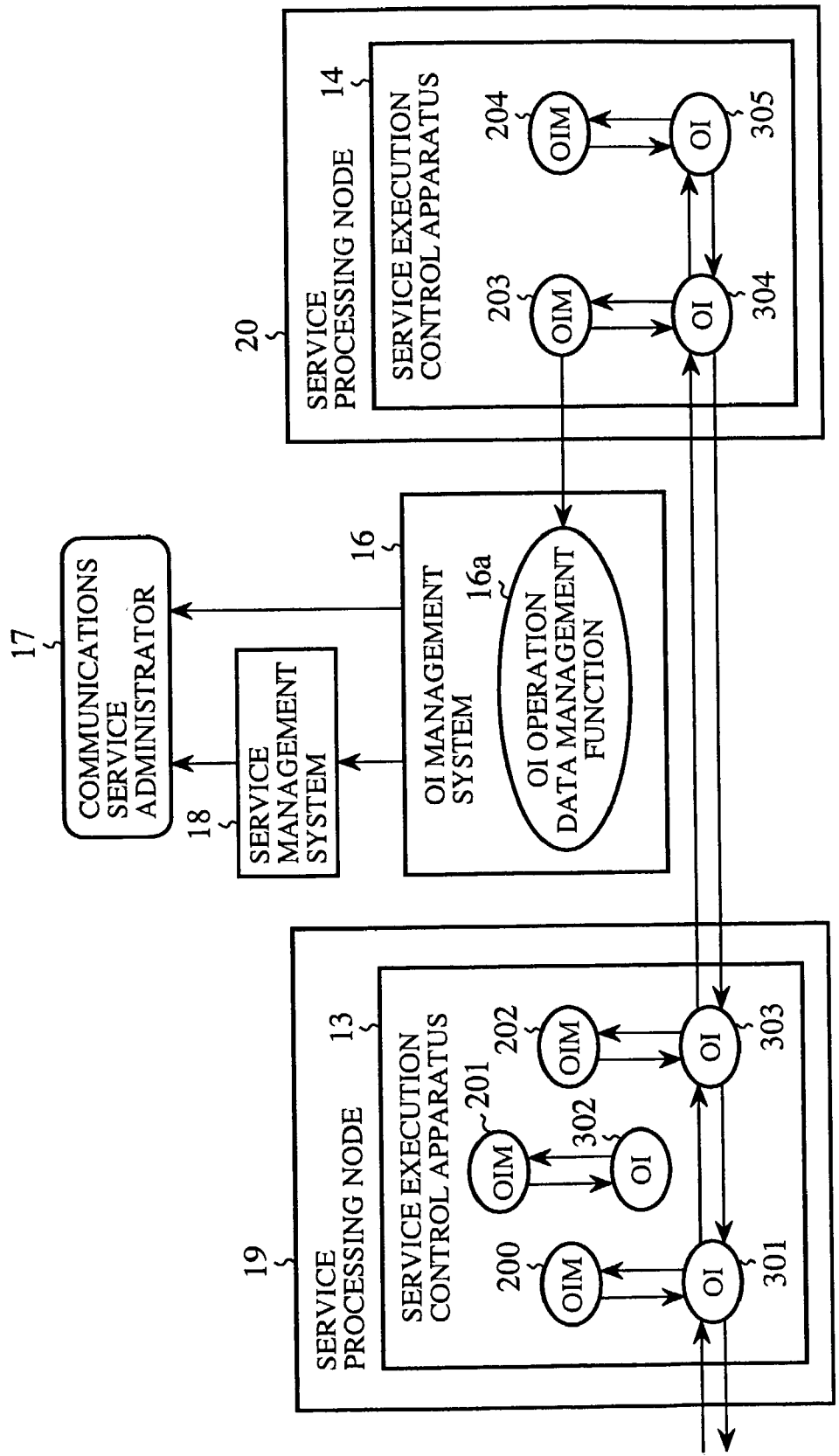
FIG. 26 is a block diagram schematically showing the configuration of a conventional service processing function monitoring apparatus.

FIG. 23 is an explanatory diagram illustrating a logical object structure using contexts employed by the data server according to the sixth embodiment. In the figure, reference numeral 23 denotes a root object, and reference numerals 23-1, 23-2, and 23-2 denote partial object structures. Even though this example indicates three partial object structures, any number of partial object structures may be employed.

Each partial object structure may consist of (physical) objects or logical objects or a combination thereof. For example, the partial object structure 23-1 consists of objects which hold state data of the data processing system/apparatus 1 as their attribute data, while the partial object structure 23-2 consists of objects which hold history data indicating changes in the state data held by the partial object structure 23-1 in time series. Furthermore, the partial object structure 23-3 consists of objects holding the data which is associated with the state data held by the partial object structure 23-1 and which was retrieved from a database, as their attribute data. A context identifier C2 manages (indicates) associations between the partial object structure 23-1 and the partial object structure 23-2 in the direction from the partial object structure 23-1 to the partial object structure 23-2, while a context identifier C3 manages (indicates) associations between the partial object structure 23-1 and the partial object structure 23-3 in the direction from the partial object structure 23-1 to the partial object structure 23-3. With this arrangement, the request from the remote display system 6 may have a structure as described below.

When the remote display system 6 needs to retrieve state data, the system sends an attribute data retrieval request including the object identifier 24 and the attribute data 24a1 included in the partial object structure 23-1. When the remote display system 6 needs to retrieve the history of changes in state data in time series, on the other hand, the system sends an attribute data retrieval request (a structural data retrieval request) including the object identifier 24, the attribute data 24a1, and the context identifier C2. Furthermore, when the remote display system 6 needs to retrieve data which is associated with state data and registered in another database, the system sends an attribute data retrieval request (a structural data retrieval request) including the object identifier 24, the attribute data 24a1, and the context identifier C3. With this arrangement, it is possible to associate one piece of state data with another as well as associating state data with data in another system such as a database.

As described above, the sixth embodiment employs the following steps. The object structure management section 4 manages a plurality of logical object structures in addition to a physical object structure; for an (physical) object identifier, the object structure management section 4 searches the physical object structure for a target object; for a logical object identifier, the object structure management section 4 searches a logical object structure for a target object; when the input/output control unit 2 has received an attribute data retrieval request including a logical object identifier from the remote display system 6, the object structure management section 4 searches a logical object structure for a target object based on the logical object identifier, and the attribute data input/output section 3 retrieves attribute data of the target object and returns it to the remote display system 6; and when the input/output control unit 2 has received a structural data retrieval request including a logical object identifier from the remote display system 6, on the other hand, the object structure management section 4 searches a logical object structure for a target object, and the object structure retrieval section 17 obtains a list of the attribute names of the target object and returns it to the remote display system 6. Therefore, it is possible to associate one piece of state data with another as well as associating state data with data in another data processing system/apparatus or a database.

What is claimed is:

1. A data server for managing state data indicating, in real time, a state of a data processing system/apparatus to be monitored, and returning the state data to a remote display system upon receiving a data retrieval request from the remote display system, said data server comprising:

a plurality of objects holding the state data as their attribute data;

attribute data input/output means for retrieving or setting arbitrary attribute data of an arbitrary object selected from among said plurality of objects;

object structure management means for managing an object structure and searching for an object based on an entered object identifier;

input/output control means for,
  (a) when the state data has been changed, determining an object identifier and an attribute name associated with the change, causing said object structure management means to search for an object, based on the object identifier determined, and causing said attribute data input/output means to update attribute data of the object by use of the state data that has been changed, and
  (b) upon receiving an attribute data retrieval request from the remote display system, causing said object structure management means to search for an object based on an object identifier included in the attribute data retrieval request, and causing said attribute data input/output means to retrieve attribute data of the object and to return the attribute data to the remote display system; and object structure retrieval means, wherein said object structure management means manages a physical object structure and a plurality of logical object structures, and, when said input/output control means has received a structural data retrieval request from the remote display system,
said object structure retrieval means,
receives an object identifier included in the structural data retrieval request through said object structure management means,
searches for an object while tracing the physical object structure,
obtains a list of attribute names of the object, and
returns the list obtained to the remote display system through said input/output control means, and
said object structure retrieval means,
upon receiving an object identifier, searches the physical object structure for an object, and
upon receiving a logical object identifier, searches the logical object structures for an object.

2. The data server as claimed in claim 1, wherein:
when said input/output control means has received an attribute data retrieval request including a logical object identifier from the remote display system,
said object structure management means receives the logical object identifier and searches the logical object structures for an object, and
said attribute data input/output means retrieves attribute data of the object and returns the attribute data to the remote display system through said input/output control means; and
when said input/output control means has received a structural data retrieval request including a logical object identifier from the remote display system,
said object structure management means receives the logical object identifier and searches the logical object structures for an object, and
said object structure retrieval means obtains a list of attribute names of the object and returns the list to the remote display system.

3. The data server as claimed in claim 1, wherein:
when said input/output control means has received a state data retrieval request dedicated for the data processing system/apparatus from the remote display system,
a request conversion means converts the dedicated state data retrieval request into an attribute data retrieval request including a logical object identifier,
said object structure management means searches for an object based on the logical object identifier converted, and
said attribute data input/output means retrieves attribute data of said object and returns the attribute data to the remote display system through said input/output control means; and
when said input/output control means has received a generic data retrieval request from the remote display system,
said request conversion means converts the generic data retrieval request into an attribute data retrieval request including a logical object identifier or a structural data retrieval request including the logical object identifier,
for the attribute data retrieval request that has been converted, including the logical object identifier, said object structure management means searches for an object based on said logical object identifier, and said attribute data input/output means retrieves attribute data of the object and returns the attribute data retrieved to the remote display system through said input/output control means, and
for the structural data retrieval request that has been converted, including the logical object identifier, said object structure management means searches for an object based on the logical object identifier, and the object structure retrieval means obtains a list of attribute names of said object and returns the list to the remote display system through said input/output control means.

4. A data server for managing state data indicating, in real time, a state of a data processing system/apparatus to be monitored, and returning the state data to a remote display system upon receiving a data retrieval request from the remote display system, said data server comprising:
a plurality of objects holding the state data as their attribute data;
attribute data input/output means for retrieving or setting arbitrary attribute data of an arbitrary object selected from among said plurality of objects;
object structure management means for managing an object structure and searching for an object based on an entered object identifier;
input/output control means for,
(a) when the state data has been changed, determining an object identifier and an attribute name associated with the change, causing said object structure management means to search for an object based on the object identifier determined, and causing said attribute data input/output means to update attribute data of the object by use of the state data that has been changed: and
(b) upon receiving an attribute data retrieval request from the remote display system, causing said object structure management means to search for an object based on an object identifier included in the attribute data retrieval request, and causing said attribute data input/output means to retrieve attribute data of the object and to return the attribute data to the remote display system;
first request conversion means for, when said input/output control means has received a state data retrieval request dedicated for the data processing system/apparatus, converting the dedicated state data retrieval request into an attribute data retrieval request; and
second request conversion means for, when said input/output control means has received a generic data retrieval request, converting the generic data retrieval request into an attribute data retrieval request or a structural data retrieval request, wherein,
for the attribute data retrieval request that has been converted, said object structure management means searches for an object, and said attribute data input/output means retrieves attribute data of the object and returns the attribute data obtained to the remote display system through said input/output control means, and
for the structural data retrieval request that has been converted, said object structure management means searches for an object, and said object structure retrieval means obtains a list of attribute names of the object and returns the list to the remote display system through said input/output control means.

* * * * *